US00RE47905E

(19) United States
(12) Reissued Patent
Chen et al.

(10) Patent Number: US RE47,905 E
(45) Date of Reissued Patent: *Mar. 17, 2020

(54) RECONFIGURABLE OPTICAL ADD-DROP MULTIPLEXERS WITH SERVO CONTROL AND DYNAMIC SPECTRAL POWER MANAGEMENT CAPABILITIES

(71) Applicant: CAPELLA PHOTONICS, INC., Mountain View, CA (US)

(72) Inventors: Tai Chen, San Jose, CA (US); Jeffrey P. Wilde, Morgan Hill, CA (US); Joseph E. Davis, Morgan Hill, CA (US)

(73) Assignee: Capella Photonics, Inc., Mountainview, CA (US)

( * ) Notice: This patent is subject to a terminal disclaimer.

(21) Appl. No.: 16/023,127

(22) Filed: Jun. 29, 2018

Related U.S. Patent Documents

Reissue of:
(64) Patent No.: Re. 42,368
Issued: May 17, 2011
Appl. No.: 12/816,084
Filed: Jun. 15, 2010

Which is a Reissue of:
(64) Patent No.: 6,879,750
Issued: Apr. 12, 2005
Appl. No.: 10/745,364
Filed: Dec. 22, 2003

U.S. Applications:
(63) Continuation of application No. 10/005,714, filed on Nov. 7, 2001, now Pat. No. 6,687,431, which is a
(Continued)

(51) Int. Cl.
*G02B 6/28* (2006.01)
*H04J 14/02* (2006.01)
(Continued)

(52) U.S. Cl.
CPC ..... *G02B 6/2931* (2013.01); *G02B 6/29313* (2013.01); *G02B 6/29383* (2013.01);
(Continued)

(58) Field of Classification Search
CPC ..... G02B 6/2931; G02B 6/29383; G02B 6/29385; G02B 6/29391; G02B 6/29395;
(Continued)

(56) References Cited

U.S. PATENT DOCUMENTS 4,367,040 A 1/1983 Goto
4,707,056 A 11/1987 Bittner
(Continued)

FOREIGN PATENT DOCUMENTS

JP H10-339825 A 12/1998
JP 2000-147247 A 5/2000
(Continued)

OTHER PUBLICATIONS

Ford et al. Wavelength Add-Drop Switching Using Tilting MicroMirrors. Journal of Lightwave Technology. vol. 17. No. 5. May 1999. (Year: 1999).*

(Continued)

*Primary Examiner* — Deandra M Hughes
(74) *Attorney, Agent, or Firm* — Sterne, Kessler, Goldstein & Fox P.L.L.C.

(57) ABSTRACT

This invention provides a novel wavelength-separating-routing (WSR) apparatus that uses a diffraction grating to separate a multi-wavelength optical signal by wavelength into multiple spectral channels, which are then focused onto an array of corresponding channel micromirrors. The channel micromirrors are individually controllable and continuously pivotable to reflect the spectral channels into selected output ports. As such, the inventive WSR apparatus is capable of routing the spectral channels on a channel-by-
(Continued)

channel basis and coupling any spectral channel into any one of the output ports. The WSR apparatus of the present invention may be further equipped with servo-control and spectral power-management capabilities, thereby maintaining the coupling efficiencies of the spectral channels into the output ports at desired values. The WSR apparatus of the present invention can be used to construct a novel class of dynamically reconfigurable optical add-drop multiplexers (OADMs) for WDM optical networking applications.

32 Claims, 12 Drawing Sheets

Related U.S. Application Data continuation of application No. 09/938,426, filed on Aug. 23, 2001, now Pat. No. 6,625,346.

(60) Provisional application No. 60/277,217, filed on Mar. 19, 2001.

(51) Int. Cl.

| | |
|---|---|
| ***G02B 6/293*** | (2006.01) |
| ***G02B 6/35*** | (2006.01) |
| *G02B 26/08* | (2006.01) |
| *G02B 6/34* | (2006.01) |
| *G02B 6/32* | (2006.01) |

(52) U.S. Cl.
CPC ..... *G02B 6/29385* (2013.01); *G02B 6/29391* (2013.01); *G02B 6/29395* (2013.01); *G02B 6/3512* (2013.01); *G02B 6/3588* (2013.01); *G02B 6/32* (2013.01); *G02B 6/34* (2013.01); *G02B 6/356* (2013.01); *G02B 6/3556* (2013.01); *G02B 6/3586* (2013.01); *G02B 6/3592* (2013.01); *G02B 26/0833* (2013.01)

(58) Field of Classification Search
CPC ..... G02B 6/3512; G02B 6/3588; G02B 6/29313; G02B 26/0833; G02B 6/32; G02B 6/34; G02B 6/3556; G02B 6/356; G02B 6/3586; G02B 6/3592
See application file for complete search history.

(56) References Cited

U.S. PATENT DOCUMENTS 4,839,884 A 6/1989 Schloss
5,233,405 A 8/1993 Wildnauer et al.
5,311,606 A 5/1994 Asakura et al.
5,414,540 A 5/1995 Patel et al.
5,477,350 A 12/1995 Riza et al.
5,526,155 A 6/1996 Knox et al.
5,600,851 A 2/1997 McLeod
5,629,790 A 5/1997 Neukermans et al.
5,661,591 A 8/1997 Lin et al.
5,740,288 A 4/1998 Pan
5,745,271 A 4/1998 Ford et al.
5,835,458 A 11/1998 Bischel et al.
5,847,831 A 12/1998 Tomlinson et al.
5,867,264 A 2/1999 Hinnrichs
5,868,480 A 2/1999 Zeinali
5,872,880 A 2/1999 Maynard
5,875,272 A 2/1999 Kewitsch et al.
5,881,199 A 3/1999 Li
5,936,752 A 8/1999 Bishop et al.
5,943,158 A 8/1999 Ford et al.
5,960,133 A 9/1999 Tomlinson
5,974,207 A 10/1999 Aksyuk et al.
6,011,884 A 1/2000 Dueck et al.
6,018,603 A 1/2000 Lundgren et al.
6,028,689 A 2/2000 Michalicek et al.
6,069,719 A 5/2000 Mizrahi
6,081,331 A 6/2000 Teichmann
6,097,859 A 8/2000 Solgaard et al.
6,134,359 A 10/2000 Keyworth et al.
6,169,624 B1 1/2001 Godil et al.
6,172,777 B1 1/2001 Flood et al.
6,178,033 B1 1/2001 Ford et al.
6,178,284 B1 1/2001 Bergmann et al.
6,193,376 B1 2/2001 Hayashi et al.
6,204,946 B1 3/2001 Aksyuk et al.
6,205,269 B1 3/2001 Morton
6,222,954 B1 4/2001 Riza
6,243,507 B1 6/2001 Goldstein et al.
6,246,818 B1 6/2001 Fukushima
6,253,001 B1 * 6/2001 Hoen ..... G02B 6/3518 385/16
6,253,135 B1 7/2001 Wade
6,256,430 B1 7/2001 Jin et al.
6,259,841 B1 7/2001 Bhagavatula
6,263,127 B1 7/2001 Dragone et al.
6,263,135 B1 7/2001 Wade
6,275,623 B1 8/2001 Brophy et al.
6,285,500 B1 9/2001 Ranalli et al.
6,289,155 B1 9/2001 Wade
6,307,657 B1 10/2001 Ford
6,343,862 B1 2/2002 Sawai et al.
6,345,133 B1 2/2002 Morozov
6,381,387 B1 4/2002 Wendland, Jr.
6,415,070 B1 7/2002 Munoz-Bustamante et al.
6,415,073 B1 7/2002 Cappiello et al.
6,415,080 B1 7/2002 Sappey et al.
6,418,250 B1 7/2002 Corbosiero et al.
6,439,728 B1 8/2002 Copeland
6,442,307 B1 8/2002 Carr et al.
6,453,087 B2 9/2002 Frish et al.
6,498,872 B2 12/2002 Bouevitch et al.
6,507,421 B1 1/2003 Bishop et al.
6,543,286 B2 4/2003 Garverick et al.
6,549,699 B2 4/2003 Belser et al.
6,567,574 B1 5/2003 Ma et al.
6,583,934 B2 * 6/2003 Kramer ..... G02B 5/1866 356/328
6,600,851 B2 7/2003 Aksyuk et al.
6,603,894 B1 * 8/2003 Pu ..... G02B 6/3582 359/223.1
6,625,340 B1 9/2003 Sparks et al.
6,625,346 B2 9/2003 Wilde et al.
6,631,222 B1 10/2003 Wagener et al.
6,634,810 B1 10/2003 Ford et al.
6,657,770 B2 12/2003 Marom et al.
6,661,948 B2 12/2003 Wilde
6,687,431 B2 * 2/2004 Chen et al. ..... 385/24
6,760,511 B2 7/2004 Garrett et al.
6,768,571 B2 7/2004 Azarov et al.
6,798,941 B2 9/2004 Smith et al.
6,798,992 B1 9/2004 Bishop et al.
6,810,169 B2 10/2004 Bouevitch et al.
6,826,349 B2 11/2004 Weverka et al.
6,842,549 B2 1/2005 So
6,859,573 B2 2/2005 Bouevitch et al.
6,879,750 B2 * 4/2005 Chen et al. ..... 385/24
6,898,348 B2 5/2005 Morozov et al.
6,928,244 B1 8/2005 Goldstein et al.
6,950,609 B2 9/2005 Marom
6,984,917 B2 1/2006 Greywall et al.
6,989,921 B2 1/2006 Bernstein et al.
7,023,604 B2 * 4/2006 Behin ..... G02B 6/3556 359/226.1
RE39,331 E 10/2006 Chen et al.
RE39,397 E 11/2006 Wilde et al.
RE39,411 E 11/2006 Belser et al.
7,183,633 B2 2/2007 Daneman et al.
RE39,515 E 3/2007 Garrett et al.
RE39,525 E 3/2007 Wilde et al.
7,676,126 B2 3/2010 McLaughlin et al.
RE42,368 E 5/2011 Chen et al.
RE42,521 E 7/2011 Garrett et al.

(56) References Cited

U.S. PATENT DOCUMENTS

| | | | | |
|---|---|---|---|---|
| RE42,678 | E * | 9/2011 | Wilde | G02B 6/2931 385/24 |
| 8,233,794 | B2 | 7/2012 | Colbourne et al. | |
| 2002/0081070 | A1 | 6/2002 | Tew | |
| 2002/0097956 | A1* | 7/2002 | Kikuchi | G02B 6/327 385/33 |
| 2002/0105692 | A1 | 8/2002 | Lauder et al. | |
| 2002/0131691 | A1 | 9/2002 | Garrett et al. | |
| 2003/0043471 | A1 | 3/2003 | Belser et al. | |

FOREIGN PATENT DOCUMENTS

| | | | |
|---|---|---|---|
| JP | 2002-519710 | A | 7/2002 |
| JP | 2003-504684 | A | 2/2003 |
| JP | 2003-506751 | A | 2/2003 |
| JP | 2003-515187 | A | 4/2003 |

OTHER PUBLICATIONS

Scobey et al. Thin Film Filter Based Components for Optical Add/Drop. OSA/WDM. 1999. (Year: 1999).*
File History of Inter Partes Review Proceeding No. IPR2014-01166, filed Jul. 15, 2014; 2822 pages.
File History of Inter Partes Review Proceeding No. IPR2014-01276, filed Aug. 12, 2014; 2971 pages.
File History of Inter Partes Review Proceeding No. IPR2015-00726, filed Feb. 12, 2015; 3879 pages.
File History of Inter Partes Review Proceeding No. 1PR2015-00727, filed Feb. 12, 2015; 2683 pages.
File History of Inter Partes Review Proceeding No. IPR2015-00731, filed Feb. 13, 2015; 3544 pages.
File History of Inter Partes Review Proceeding No. IPR2015-00739, filed Feb. 14, 2015; 3750 pages.
File History of Inter Partes Review Proceeding No. IPR2015-00816, filed Feb. 26, 2015; 1719 pages.
File History of Inter Partes Review Proceeding No. IPR2015-00894, filed Mar. 17, 2015; 1980 pages.
File History of Inter Partes Review Proceeding No. IPR2015-01958, filed Sep. 24, 2015; 1778 pages.
File History of Inter Partes Review Proceeding No. IPR2015-01961, filed Sep. 24, 2015; 1895 pages.
File History of Inter Partes Review Proceeding No. IPR2015-01969, filed Sep. 25, 2015; 1069 pages.
File History of Inter Partes Review Proceeding No. IPR2015-01971, filed Sep. 25, 2015; 1275 pages.
File History for U.S. Court of Appeals Case No. 2016-2394, filed Jul. 27, 2016; 4283 pages.
File History for U.S. Supreme Court Case No. 18-314 (appeal of Federal Circuit Case Nos. 2016-2394, 2016-2395, 2017-1105, 2017-1106, 2017-1107, 2017-1108), filed Sep. 6, 2018; 508 pages.
Kurt E. Petersen, Silicon as a Mechanical Material, Proceedings of the IEEE, vol. 70, No. 5, 1982; pp. 420-457.
Docket from U.S. District Court Case No. 3-14-cv-03351, filed Jul. 25, 2014; 15 pages.
Docket from U.S. District Court Case No. 3-14-cv-03348, filed Jul. 24, 2014; 22 pages.
Docket from U.S. District Court Case No. 3-14-cv-03349, filed Jul. 24, 2014; 11 pages.
Docket from U.S. District Court Case No. 3-14-cv-03350, filed Jul. 24, 2014; 11 pages.
Docket from U.S. District Court Case No. 1-14-cv-22701, filed Jul. 21, 2014; 2 pages.
Docket from U.S. District Court Case No. 0-14-cv-61629, filed Jul. 15, 2014; 4 pages.
Docket from U.S. District Court Case No. 0-14-cv-60350, filed Feb. 12, 2014; 8 pages.
Docket from U.S. District Court Case No. 1-14-cv-20529, filed Feb. 12, 2014; 9 pages.
Docket from U.S. District Court Case No. 1-14-cv-20530, filed Feb. 12, 2014; 12 pages.
Docket from U.S. District Court Case No. 1-14-cv-20531, filed Feb. 12, 2014; 8 pages.

* cited by examiner

RECONFIGURABLE OPTICAL ADD-DROP MULTIPLEXERS WITH SERVO CONTROL AND DYNAMIC SPECTRAL POWER MANAGEMENT CAPABILITIES

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue; a claim printed with strikethrough indicates that the claim was canceled, disclaimed, or held invalid by a prior post-patent action or proceeding.

This is a reissue of U.S. Reissue Pat. No. RE42,368 (U.S. application Ser. No. 12/816,084 filed Jun. 15, 2010), which is a reissue of U.S. Pat. No. 6,879,750 (U.S. application Ser. No. 10/745,364 filed Dec. 22, 2003).

CROSS-REFERENCE TO RELATED APPLICATIONS

This application is a continuation of U.S. application Ser. No. 10/005,714, filed Nov. 7, 2001 now U.S. Pat. No. 6,687,431, which is a continuation of U.S. application Ser. No. 09/938,426, filed Aug. 23, 2001, now U.S. Pat. No. 6,625,346 which claims the benefit of U.S. application Ser. No. 60/277,217, filed Mar. 19, 2001.

FIELD OF THE INVENTION

This invention relates generally to optical communication systems. More specifically, it relates to a novel class of dynamically reconfigurable optical add-drop multiplexers (OADMs) for wavelength division multiplexed optical networking applications.

BACKGROUND

As fiber-optic communication networks rapidly spread into every walk of modern life, there is a growing demand for optical components and subsystems that enable the fiber-optic communications networks to be increasingly scalable, versatile, robust, and cost-effective.

Contemporary fiber-optic communications networks commonly employ wavelength division multiplexing (WDM), for it allows multiple information (or data) channels to be simultaneously transmitted on a single optical fiber by using different wavelengths and thereby significantly enhances the information bandwidth of the fiber. The prevalence of WDM technology has made optical add-drop multiplexers indispensable building blocks of modern fiber-optic communication networks. An optical add-drop multiplexer (OADM) serves to selectively remove (or drop) one or more wavelengths from a multiplicity of wavelengths on an optical fiber, hence taking away one or more data channels from the traffic stream on the fiber. It further adds one or more wavelengths back onto the fiber, thereby inserting new data channels in the same stream of traffic. As such, an OADM makes it possible to launch and retrieve multiple data channels (each characterized by a distinct wavelength) onto and from an optical fiber respectively, without disrupting the overall traffic flow along the fiber. Indeed, careful placement of the OADMs can dramatically improve an optical communication network's flexibility and robustness, while providing significant cost advantages.

Conventional OADMs in the art typically employ multiplexers/demultiplexers (e.g. waveguide grating routers or arrayed-waveguide gratings), tunable filters, optical switches, and optical circulators in a parallel or serial architecture to accomplish the add and drop functions. In the parallel architecture, as exemplified in U.S. Pat. No. 5,974,207, a demultiplexer (e.g., a waveguide grating router) first separates a multi-wavelength signal into its constituent spectral components. A wavelength switching/routing means (e.g., a combination of optical switches and optical circulators) then serves to drop selective wavelengths and add others. Finally, a multiplexer combines the remaining (i.e., the pass-through) wavelengths into an output multi-wavelength optical signal. In the serial architecture, as exemplified in U.S. Pat. No. 6,205,269, tunable filters (e.g., Bragg fiber gratings) in combination with optical circulators are used to separate the drop wavelengths from the pass-through wavelengths and subsequently launch the add channels into the pass-through path. And if multiple wavelengths are to be added and dropped, additional multiplexers and demultiplexers are required to demultiplex the drop wavelengths and multiplex the add wavelengths, respectively. Irrespective of the underlying architecture, the OADMs currently in the art are characteristically high in cost, and prone to significant optical loss accumulation. Moreover, the designs of these OADMs are such that it is inherently difficult to reconfigure them in a dynamic fashion.

U.S. Pat. No. 6,204,946 to Askyuk et al. discloses an OADM that makes use of free-space optics in a parallel construction. In this case, a multi-wavelength optical signal emerging from an input port is incident onto a ruled diffraction grating. The constituent spectral channels thus separated are then focused by a focusing lens onto a linear array of binary micromachined mirrors. Each micromirror is configured to operate between two discrete states, such that it either retroreflects its corresponding spectral channel back into the input port as a pass-through channel, or directs its spectral channel to an output port as a drop channel. As such, the pass-through signal (i.e., the combined pass-through channels) shares the same input port as the input signal. An optical circulator is therefore coupled to the input port, to provide necessary routing of these two signals. Likewise, the drop channels share the output port with the add channels. An additionally optical circulator is thereby coupled to the output port, from which the drop channels exit and the add channels are introduced into the output port. The add channels are subsequently combined with the pass-through signal by way of the diffraction grating and the binary micromirrors.

Although the aforementioned OADM disclosed by Askyuk et al. has the advantage of performing wavelength separating and routing in free space and thereby incurring less optical loss, it suffers a number of limitations. First, it requires that the pass-through signal share the same port/fiber as the input signal. An optical circulator therefore has to be implemented, to provide necessary routing of these two signals. Likewise, all the add and drop channels enter and leave the OADM through the same output port, hence the need for another optical circulator. Moreover, additional means must be provided to multiplex the add channels before entering the system and to demultiplex the drop channels after exiting the system. This additional multiplexing/demultiplexing requirement adds more cost and complexity that can restrict the versatility of the OADM thus-constructed. Second, the optical circulators implemented in this OADM for various routing purposes introduce additional optical losses, which can accumulate to a substantial amount. Third, the constituent optical components must be in a precise alignment, in order for the system to achieve its intended purpose. There are, however, no provisions provided for maintaining the requisite alignment; and no mechanisms implemented for overcoming degradation in the alignment owing to environmental effects such as thermal and mechanical disturbances over the course of operation.

U.S. Pat. No. 5,906,133 to Tomlinson discloses an OADM that makes use of a design similar to that of Aksyuk et al. There are input, output, drop and add ports implemented in this case. By positioning the four ports in a specific arrangement, each micromirror, notwithstanding switchable between two discrete positions, either reflects its corresponding channel (coming from the input port) to the output port, or concomitantly reflects its channel to the drop port and an incident add channel to the output port. As such, this OADM is able to perform both the add and drop functions without involving additional optical components (such as optical circulators used in the system of Aksyuk et al.). However, because a single drop port is designated for all the drop channels and a single add port is designated for all the add channels, the add channels would have be multiplexed before entering the add port and the drop channels likewise need to be demultiplexed upon exiting from the drop port. Moreover, as in the case of Askyuk et al., there are no provisions provided for maintaining requisite optical alignment in the system, an no mechanisms implemented for combating degradation in the alignment due to environmental effects over the course of operation.

As such, the prevailing drawbacks suffered by the OADMs currently in the art are summarized as follows:

1) The wavelength routing is intrinsically static, rendering it difficult to dynamically reconfigure these OADMs.
2) Add and/or drop channels often need to be multiplexed and/or demultiplexed, thereby imposing additional complexity and cost.
3) Stringent fabrication tolerance and painstaking optical alignment are required. Moreover, the optical alignment is not actively maintained, rendering it susceptible to environmental effects such as thermal and mechanical disturbances over the course of operation.
4) In an optical communication network, OADMs are typically in a ring or cascaded configuration. In order to mitigate the interference amongst OADMs, which often adversely affects the overall performance of the network, it is essential that the power levels of spectral channels entering and exiting each OADM be managed in a systematic way, for instance, by introducing power (or gain) equalization at each stage. Such a power equalization capability is also needed for compensating for non-uniform gain caused by optical amplifiers (e.g., erbium doped fiber amplifiers) in the network. There lacks, however, a systematic and dynamic management of the power levels of various spectral channels in these OADMs.
5) The inherent high cost and heavy optical loss further impede the wide application of these OADMs.

In view of the foregoing, there is an urgent need in the art for optical add-drop multiplexers that overcome the aforementioned shortcomings in a simple, effective, and economical construction.

SUMMARY

The present invention provides a wavelength-separating-routing (WSR) apparatus and method which employ an array of fiber collimators serving as an input port and a plurality of output ports; a wavelength-separator; a beam-focuser; and an array of channel micromirrors.

In operation, a multi-wavelength optical signal emerges from the input port. The wavelength-separator separates the multi-wavelength optical signal into multiple spectral channels, each characterized by a distinct center wavelength and associated bandwidth. The beam-focuser focuses the spectral channels into corresponding spectral spots. The channel micromirrors are positioned such that each channel micromirror receives one of the spectral channels. The channel micromirrors are individually controllable and movable, e.g., continuously pivotable (or rotatable), so as to reflect the spectral channels into selected ones of the output ports. As such, each channel micromirror is assigned to a specific spectral channel, hence the name "channel micromirror". And each output port may receive any number of the reflected spectral channels.

A distinct feature of the channel micromirrors in the present invention, in contrast to those used in the prior art, is that the motion, e.g., pivoting (or rotation), of each channel micromirror is under analog control such that its pivoting angle can be continuously adjusted. This enables each channel micromirror to scan its corresponding spectral channel across all possible output ports and thereby direct the spectral channel to any desired output port.

In the WSR apparatus of the present invention, the wavelength-separator may be provided by a ruled diffraction grating, a holographic diffraction grating, an echelle grating, a curved diffraction grating, a dispersing prism, or other wavelength-separating means known in the art. The beam-focuser may be a single lens, an assembly of lenses, or other beam-focusing means known in the art. The channel micromirrors may be provided by silicon micromachined mirrors, reflective ribbons (or membranes), or other types of beam-deflecting means known in the art. And each channel micromirror may be pivotable about one or two axes. The fiber collimators serving as the input and output ports may be arranged in a one-dimensional or two-dimensional array. In the latter case, the channel micromirrors must be pivotable biaxially.

The WSR apparatus of the present invention may further comprise an array of collimator-alignment mirrors, in optical communication with the wavelength-separator and the fiber collimators, for adjusting the alignment of the input multi-wavelength signal and directing the spectral channels into the selected output ports by way of angular control of the collimated beams. Each collimator-alignment mirror may be rotatable about one or two axes. The collimator-alignment mirrors may be arranged in a one-dimensional or two-dimensional array. First and second arrays of imaging lenses may additionally be optically interposed between the collimator-alignment mirrors and the fiber collimators in a telecentric arrangement, thereby "imaging" the collimator-alignment mirrors onto the corresponding fiber collimators to ensure an optimal alignment.

The WSR apparatus of the present invention may further include a servo-control assembly, in communication with the channel micromirrors and the output ports. The servo-control assembly serves to monitor the power levels of the spectral channels coupled into the output ports and further provide control of the channel micromirrors on an individual basis, so as to maintain a predetermined coupling efficiency of each spectral channel in one of the output ports. As such, the servo-control assembly provides dynamic control of the coupling of the spectral channels into the respective output ports and actively manages the power levels of the spectral channels coupled into the output ports. (If the WSR apparatus includes an array of collimator-alignment mirrors as described above, the servo-control assembly may additionally provide dynamic control of the collimator-alignment mirrors.) Moreover, the utilization of such a servo-control assembly effectively relaxes the requisite fabrication tolerances and the precision of optical alignment during assembly of a WSR apparatus of the present invention, and further enables the system to correct for shift in optical alignment over the course of operation. A WSR apparatus incorporating a servo-control assembly thus described is termed a WSR-S apparatus, thereinafter in the present invention.

Accordingly, the WSR-S (or WSR) apparatus of the present invention may be used to construct a variety of optical devices, including a novel class of dynamically reconfigurable optical add-drop multiplexers (OADMs), as exemplified in the following embodiments.

One embodiment of an OADM of the present invention comprises an aforementioned WSR-S (or WSR) apparatus and an optical combiner. The output ports of the WSR-S apparatus include a pass-through port and one or more drop ports, each carrying any number of the spectral channels. The optical combiner is coupled to the pass-through port, serving to combine the pass-through channels with one or more add spectral channels. The combined optical signal constitutes an output signal of the system. The optical combiner may be an N×1 (N≥2) broadband fiber-optic coupler, for instance, which also serves the purpose of multiplexing a multiplicity of add spectral channels to be coupled into the system.

In another embodiment of an OADM of the present invention, a first WSR-S (or WSR) apparatus is cascaded with a second WSR-S (or WSR) apparatus. The output ports of the first WSR-S (or WSR) apparatus include a passthrough port and one or more drop ports. The second WSR-S (or WSR) apparatus includes a plurality of input ports and an exiting port. The configuration is such that the pass-through channels from the first WSR-S apparatus and one or more add channels are directed into the input ports of the second WSR-S apparatus, and consequently multiplexed into an output multi-wavelength optical signal directed into the exiting port of the second WSR-S apparatus. That is to say that in this embodiment, one WSR-S apparatus (e.g., the first one) effectively performs a dynamic drop function, whereas the other WSR-S apparatus (e.g., the second one) carries out a dynamic add function. And there are essentially no fundamental restrictions on the wavelengths that can be added or dropped, other than those imposed by the overall communication system. Moreover, the underlying OADM architecture thus presented is intrinsically scalable and can be readily extended to any number of the WSR-S (or WSR) systems, if so desired for performing intricate add and drop functions in a network environment.

Those skilled in the art will recognize that the aforementioned embodiments provide only two of many embodiments of a dynamically reconfigurable OADM according to the present invention. Various changes, substitutions, and alternations can be made herein, without departing from the principles and the scope of the invention. Accordingly, a skilled artisan can design an OADM in accordance with the present invention, to best suit a given application.

All in all, the OADMs of the present invention provide many advantages over the prior art devices, notably:

1) By advantageously employing an array of channel micromirrors that are individually and continuously controllable, an OADM of the present invention is capable of routing the spectral channels on a channel-by-channel basis and directing any spectral channel into any one of the output ports. As such, its underlying operation is dynamically reconfigurable, and its underlying architecture is intrinsically scalable to a large number of channel counts.
2) The add and drop spectral channels need not be multiplexed and demultiplexed before entering and after leaving the OADM respectively. And there are not fundamental restrictions on the wavelengths to be added or dropped.
3) The coupling of the spectral channels into the output ports is dynamically controlled by a servo-control assembly, rendering the OADM less susceptible to environmental effects (such as thermal and mechanical disturbances) and therefore more robust in performance. By maintaining an optimal optical alignment, the optical losses incurred by the spectral channels are also significantly reduced.
4) The power levels of the spectral channels coupled into the output ports can be dynamically managed according to demand, or maintained at desired values (e.g., equalized at a predetermined value) by way of the servo-control assembly. This spectral power-management capability as an integral part of the OADM will be particularly desirable in WDM optical networking applications.
5) The use of free-space optics provides a simple, low loss, and cost-effective construction. Moreover, the utilization of the servo-control assembly effectively relaxes the requisite fabrication tolerances and the precision of optical alignment during initial assembly, enabling the OADM to be simpler and more adaptable in structure, lower in cost and optical loss.
6) The underlying OADM architecture allows a multiplicity of the OADMs according to the present invention to be readily assembled (e.g., cascaded) for WDM optical networking applications.

The novel features of this invention, as well as the invention itself, will be best understood from the following drawings and detailed description.

DETAILED DESCRIPTION

In this specification and appending claims, a "spectral channel" is characterized by a distinct center wavelength and associated bandwidth. Each spectral channel may carry a unique information signal, as in WDM optical networking applications.

Figure 1A:
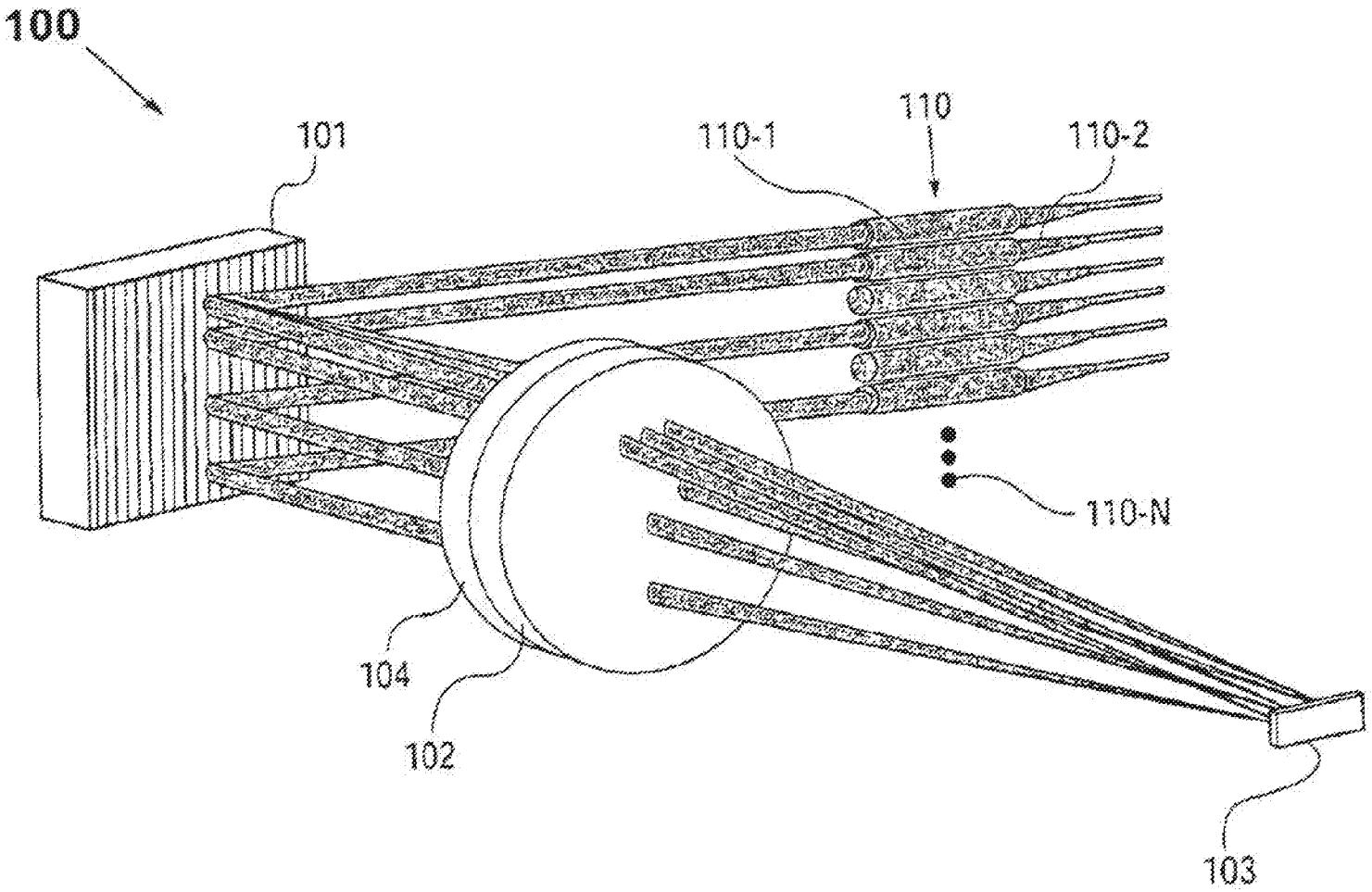
FIGS. 1A-1D show a first embodiment of a wavelength-separating-routing (WSR) apparatus according to the present invention, and the modeling results demonstrating the performance of the WSR apparatus.

FIG. 1A depicts a first embodiment of a wavelength-separating-routing (WSR) apparatus according to the present invention. By way of example to illustrate the general principles and the topological structure of a wavelength-separating-routing (WSR) apparatus of the present invention, the WSR apparatus 100 comprises multiple input/output ports which may be in the form of an array of fiber collimators 110, providing an input port 110-1 and a plurality of output ports 110-2 through 110-N (N≥3); a wavelength-separator which in one form may be a diffraction grating 101; a beam-focuser in the form of a focusing lens 102; and an array of channel micromirrors 103.

In operation, a multi-wavelength optical signal emerges from the input port 110-1. The diffraction grating 101 angularly separates the multi-wavelength optical signal into multiple spectral channels, which are in turn focused by the focusing lens 102 into a spatial array of distinct spectral spots (not shown in FIG. 1A) in a one-to-one correspondence. The channel micromirrors 103 are positioned in accordance with the spatial array formed by the spectral spots, such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N by way of the focusing lens 102 and the diffraction grating 101. As such, each channel micromirror is assigned to a specific spectral channel, hence the name "channel micromirror". Each output port may receive any number of the reflected spectral channels.

For purposes of illustration and clarity, only a selective few (e.g., three) of the spectral channels, along with the input multi-wavelength optical signal, are graphically illustrated in FIG. 1A and the following figures. It should be noted, however, that there can be any number of the spectral channels in a WSR apparatus of the present invention (so long as the number of spectral channels does not exceed the number of channel mirrors employed in the system). It should also be noted that the optical beams representing the spectral channels shown in FIG. 1A and the following figures are provided for illustrative purpose only. That is, their sizes and shapes may not be drawn according to scale. For instance, the input beam and the corresponding diffracted beams generally have different cross-sectional shapes, so long as the angle of incidence upon the diffraction grating is not equal to the angle of diffraction, as is known to those skilled in the art.

In the embodiment of FIG. 1A, it is preferable that the diffraction grating 101 and the channel micromirrors 103 are placed respectively at the first and second (i.e., the front and back) focal points (on the opposing sides) of the focusing lens 102. Such a telecentric arrangement allows the chief rays of the focused beams to be parallel to each other and generally parallel to the optical axis. In this application, the telecentric configuration further allows the reflected spectral channels to be efficiently coupled into the respective output ports, thereby minimizing various translational walk-off effects that may otherwise arise. Moreover, the input multi-wavelength optical signal is preferably collimated and circular in cross-section. The corresponding spectral channels diffracted from the diffraction grating 101 are generally elliptical in cross-section; they may be of the same size as the input beam in one dimension and elongated in the other dimension.

It is known that the diffraction efficiency of a diffraction grating is generally polarization-dependent. That is, the diffraction efficiency of a grating in a standard mounting configuration may be considerably higher for P-polarization that is perpendicular to the groove lines on the grating than for S-polarization that is orthogonal to P-polarization, especially as the number of groove lines (per unit length) increases. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total of approximately 90-degree rotation in polarization upon traversing the quarter-wave plate 104 twice. (That is, if a beam of light has P-polarization when first encountering the diffraction grating, it would have predominantly (if not all) S-polarization upon the second encountering, and vice versa.) This ensures that all the spectral channels incur nearly the same amount of round-trip polarization dependent loss.

Figure 1B:
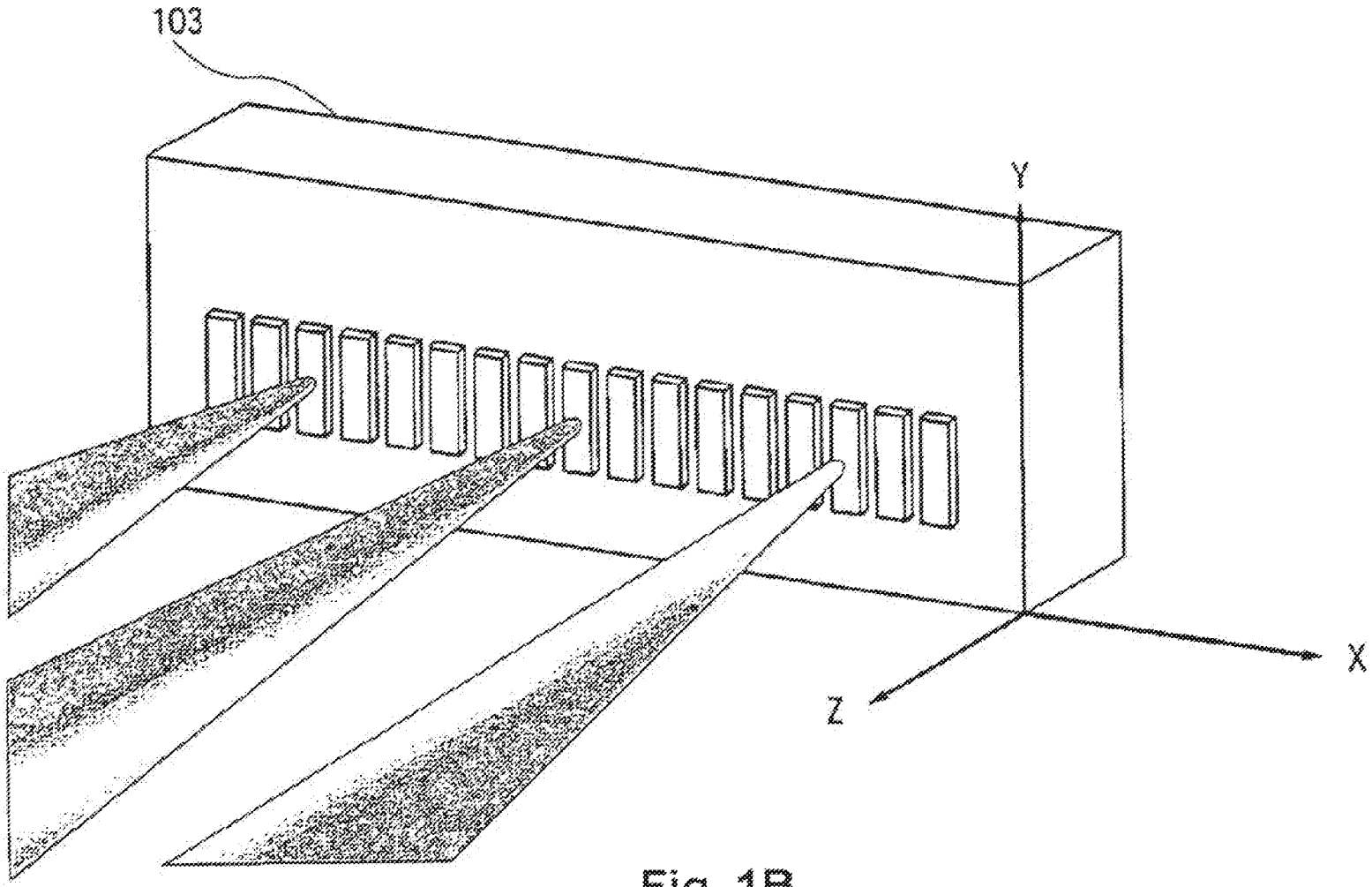

In the WSR apparatus 100 of FIG. 1A, the diffraction grating 101, by way of example, is oriented such that the focused spots of the spectral channels fall onto the channel micromirrors 103 in a horizontal array, as illustrated in FIG. 1B.

Depicted in FIG. 1B is a close-up view of the channel micromirrors 103 shown in the embodiment of FIG. 1A. By way of example, the channel micromirrors 103 are arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) Let the reflective surface of each channel micromirror lie in the x-y plane as defined in the figure and be movable, e.g., pivotable (or deflectable) about the x-axis in an analog (or continuous) manner. Each spectral channel, upon reflection, is deflected in the y-direction (e.g., downward) relative to its incident direction, so to be directed into one of the output ports 110-2 through 110-N shown in FIG. 1A.

Figure 1C:
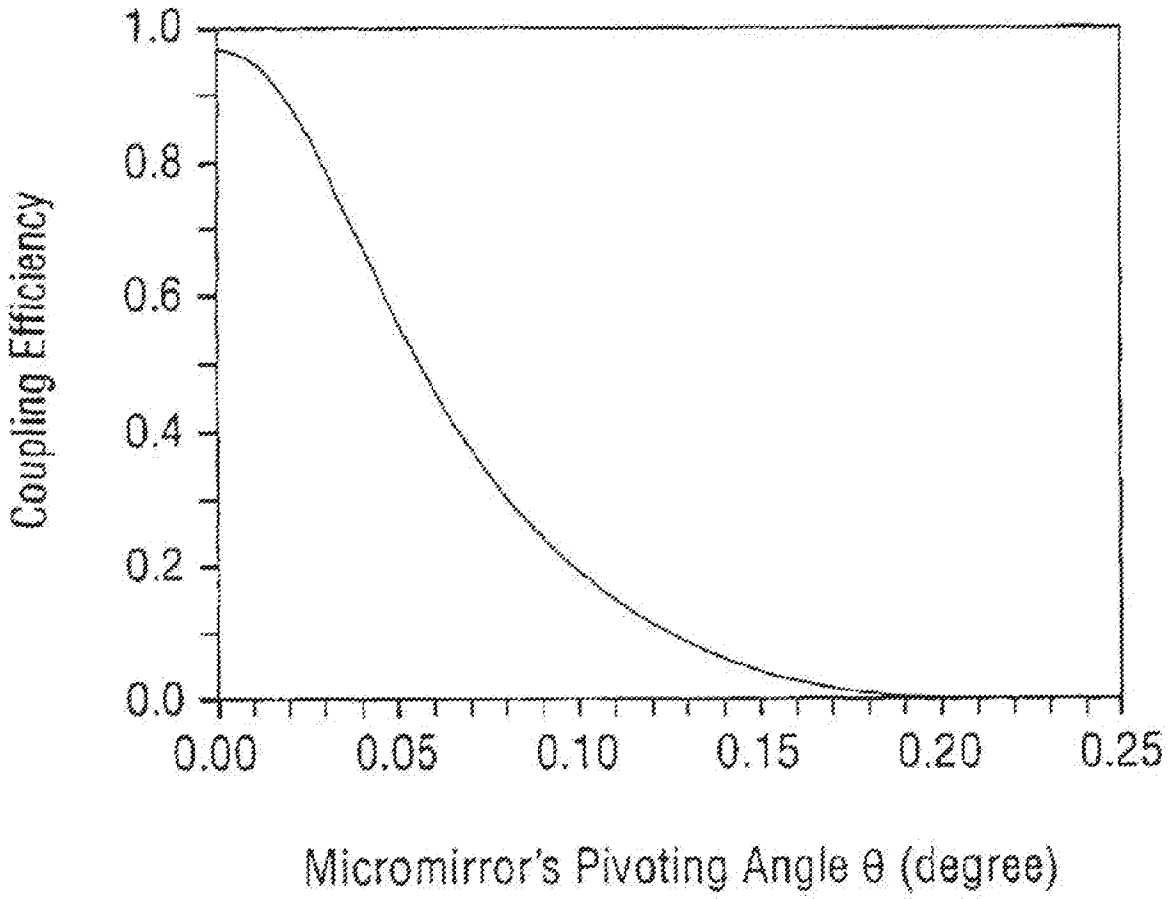
Figure 1D:
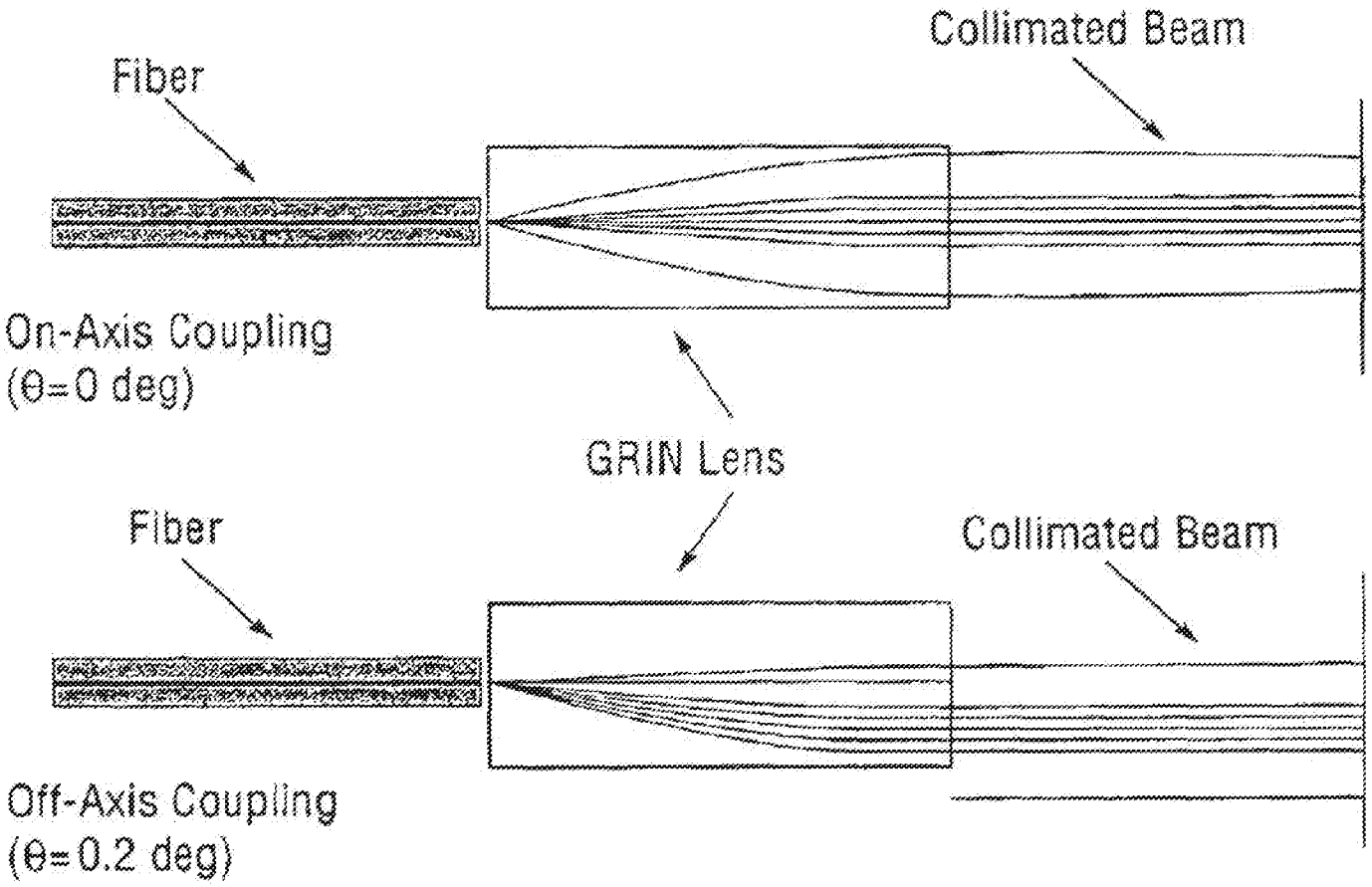

As described above, a unique feature of the present invention is that the motion of each channel micromirror is individually and continuously controllable, such that its position, e.g., pivoting angle, can be continuously adjusted. This enables each channel micromirror to scan its corresponding spectral channel across all possible output ports and thereby direct the spectral channel to any desired output port. To illustrate this capability, FIG. 1C shows a plot of coupling efficiency as a function of a channel micromirror's pivoting angle θ, provided by a ray-tracing model of a WSR apparatus in the embodiment of FIG. 1A. As used herein, the coupling efficiency for a spectral channel is defined as the ratio of the amount of optical power coupled into the fiber cone in an output port to the total amount of optical power incident upon the entrance surface of the fiber (associated with the fiber collimator serving as the output port). In the ray-tracing model, the input optical signal is incident upon a diffraction grating with 700 lines per millimeter at a grazing angle of 85 degrees, where the grating is blazed to optimize the diffraction efficiency for the "~1" order. The focusing lens has a focal length of 100 mm. Each output port is provided by a quarter-pitch GRIN lens (2 mm in diameter) coupled to an optical fiber (see FIG. 1D). As displayed in FIG. 1C, the coupling efficiency varies with the pivoting angle θ, and it requires about a 0.2-degree change in θ for the coupling efficiency to become practically negligible in this exemplary case. As such, each spectral channel may practically acquire any coupling efficiency value by way of controlling the pivoting angle of its corresponding channel micromirror. This is also to say that variable optical attenuation at the granularity of a single wavelength can be obtained in a WSR apparatus of the present invention. FIG. 1D provides ray-tracing illustrations of two extreme points on the coupling efficiency vs. θ curve of FIG. 1C; on-axis coupling corresponding to θ=0, where the coupling efficiency is maximum; and off-axis coupling corresponding to θ=0.2 degrees, where the representative collimated beam (representing an exemplary spectral channel) undergoes a significant translational walk-off and renders the coupling efficiency practically negligible. All in all, the exemplary modeling results thus described demonstrate the unique capabilities of the WSR apparatus of the present invention.

FIG. 1A provides one of many embodiments of a WSR apparatus according to the present invention. In general, the wavelength-separator is a wavelength-separating means that may be a ruled diffraction grating, a holographic diffraction grating, an echelle grating, a dispersing prism, or other types of spectral-separating means known in the art. The beam-focuser may be a focusing lens, an assembly of lenses, or other beam-focusing means known in the art. The focusing function may also be accomplished by using a curved diffraction grating as the wavelength-separator. The channel micromirrors may be provided by silicon micromachined mirrors, reflective ribbons (or membranes), or other types of beam-deflecting elements known in the art. And each micromirror may be pivoted about one or two axes. What is important is that the pivoting (or rotational) motion of each channel micromirror be individually controllable in an analog manner, whereby the pivoting angle can be continuously adjusted so as to enable the channel micromirror to scan a spectral channel across all possible output ports. The underlying fabrication techniques for micromachined mirrors and associated actuation mechanisms are well documented in the art, see U.S. Pat. No. 5,629,790 for example. Moreover, a fiber collimator is typically in the form of a collimating lens (such as a GRIN lens) and a ferrule-mounted fiber packaged together in a mechanically rigid stainless steel (or glass) tube. The fiber collimators serving as the input and output ports may be arranged in a one-dimensional array, a two-dimensional array, or other desired spatial pattern. For instance, they may be conveniently mounted in a linear array along a V-groove fabricated on a substrate made of silicon, plastic, or ceramic, as commonly practiced in the art. It should be noted, however, that the input port and the output ports need not necessarily be in close spatial proximity with each other, such as in an array configuration (although a close packing would reduce the rotational range required for each channel micromirror). Those skilled in the art will know how to design a WSR apparatus according to the present invention, to best suit a given application.

Figure 2A:
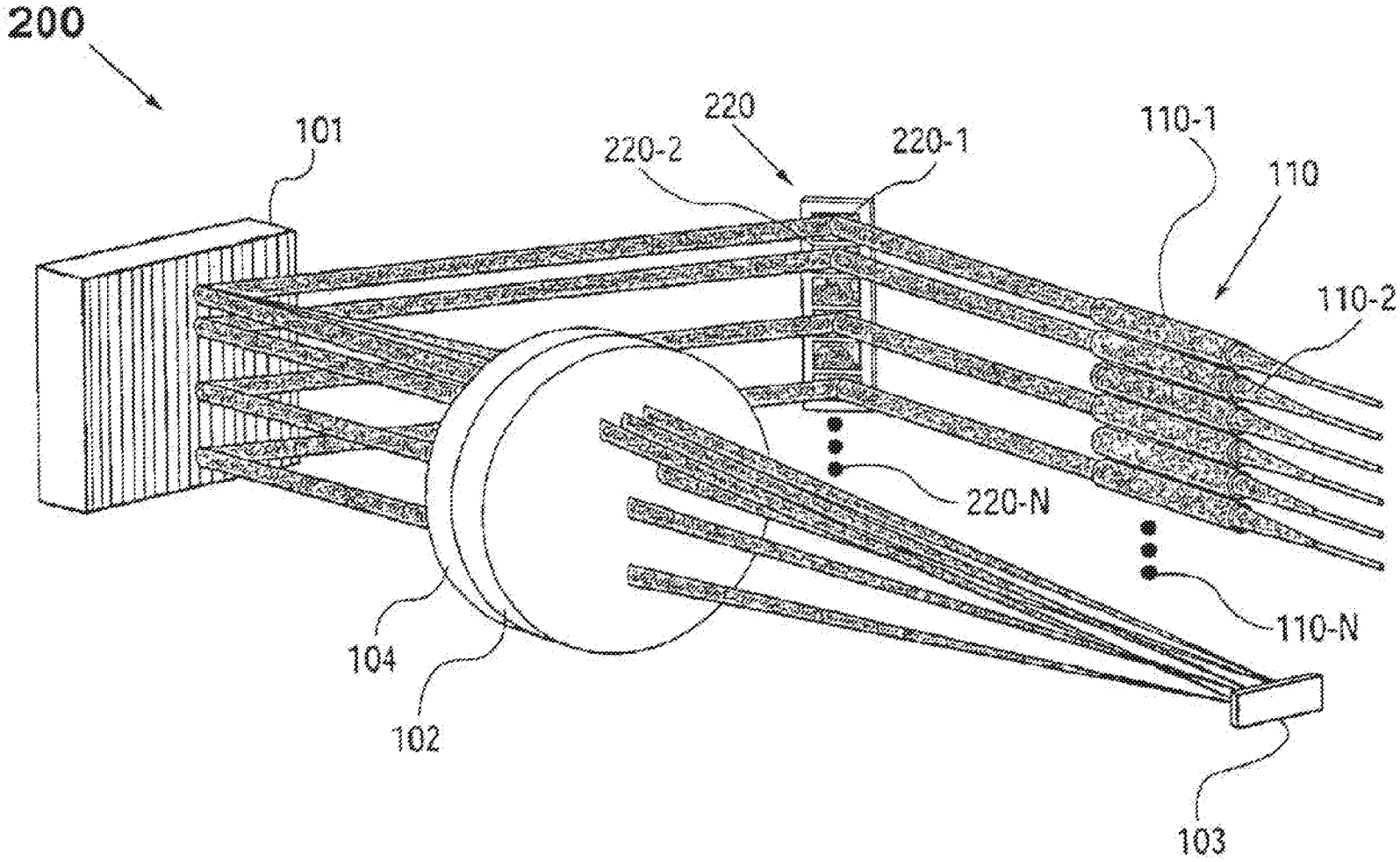
FIGS. 2A-2C depict second and third embodiments of a WSR apparatus according to the present invention.
Figure 2B:
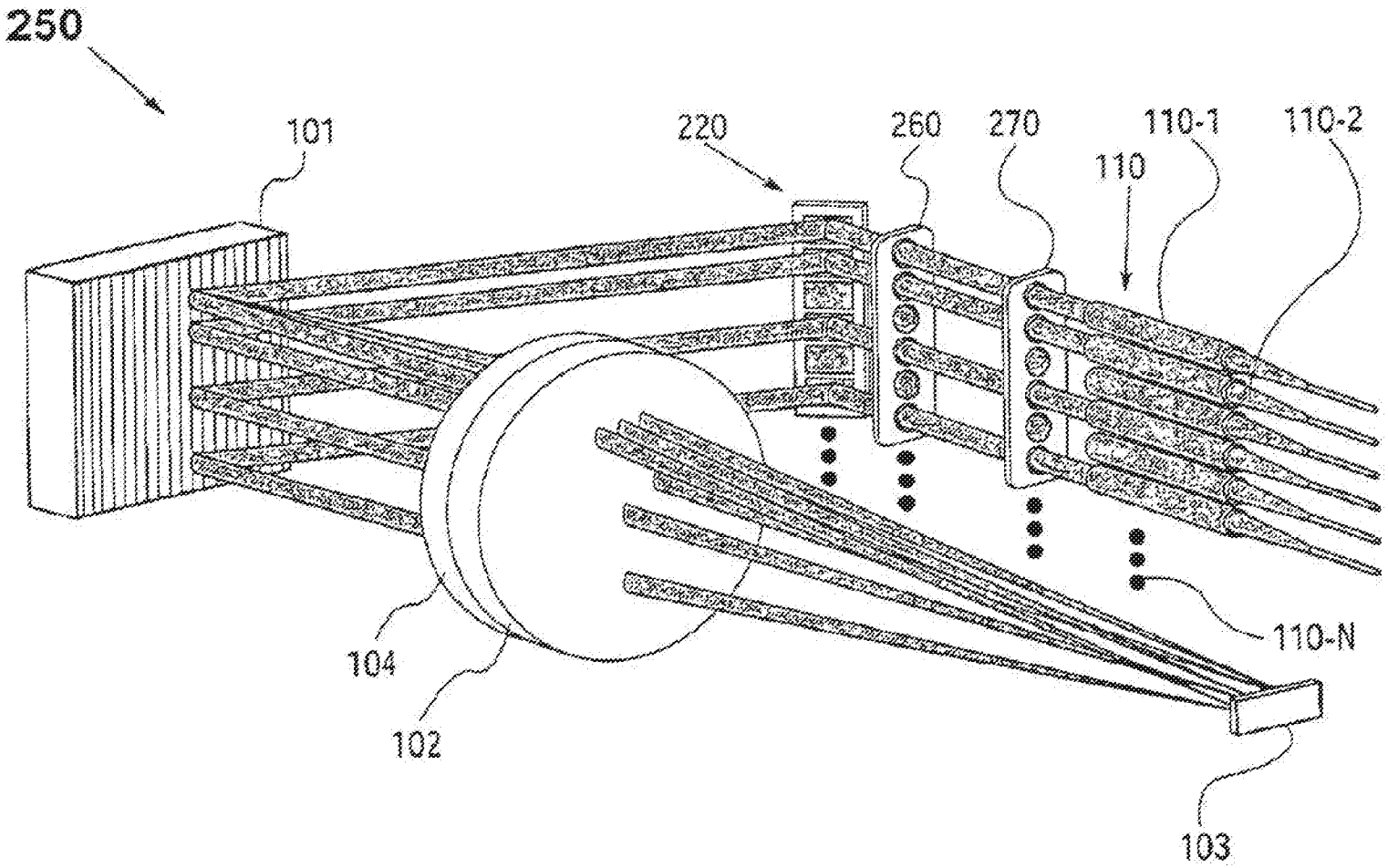
Figure 3:
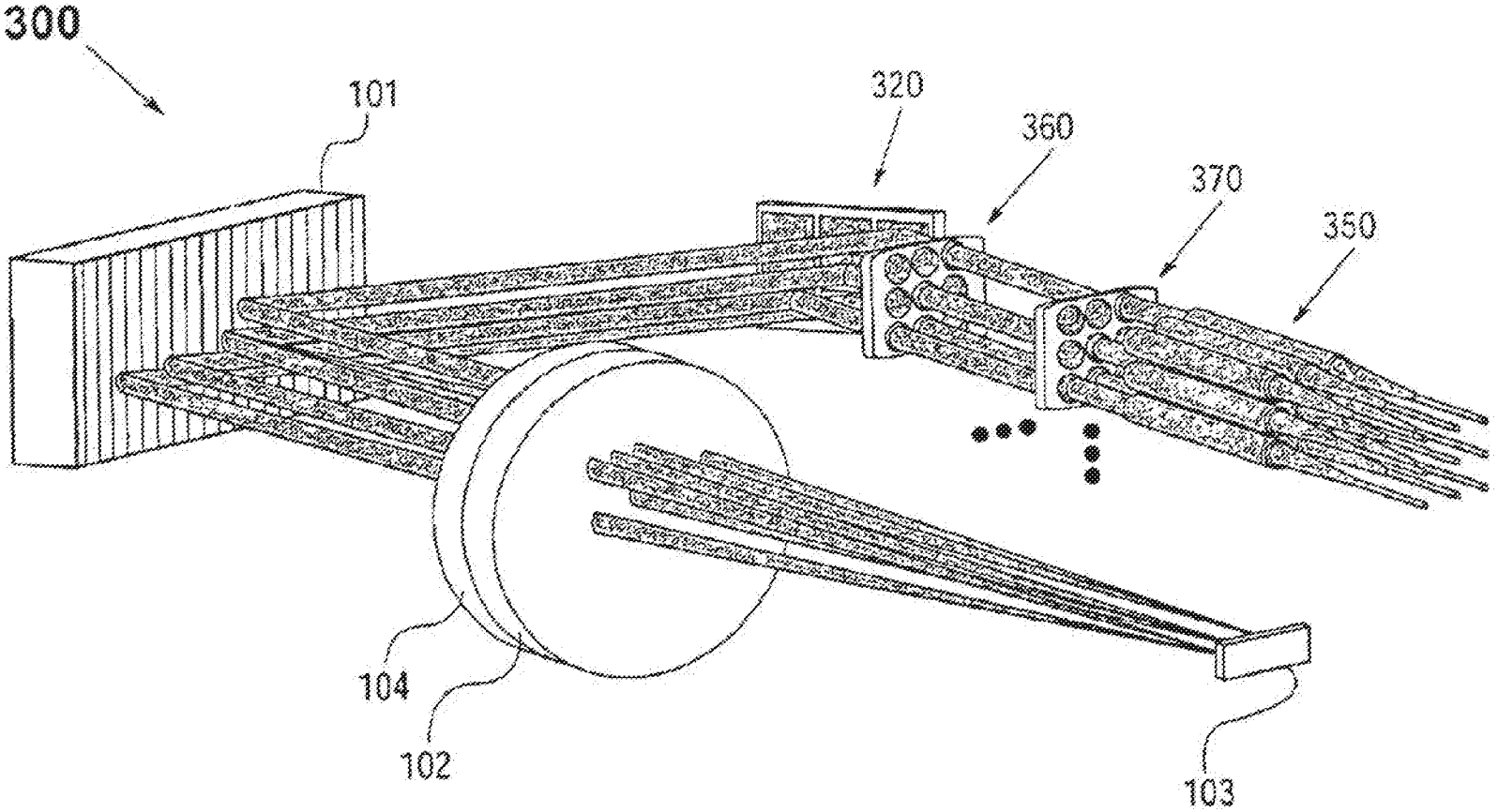
FIG. 3 shows a fourth embodiment of a WSR apparatus according to the present invention.

A WSR apparatus of the present invention may further comprise an array of collimator-alignment mirrors, for adjusting the alignment of the input multi-wavelength optical signal and facilitating the coupling of the spectral channels into the respective output ports, as shown in FIGS. 2A-2B and 3.

Depicted in FIG. 2A is a second embodiment of a WSR apparatus according to the present invention. By way of example, WSR apparatus 200 is built upon and hence shares a number of the elements used in the embodiment of FIG. 1A, as identified by those labeled with identical numerals. Moreover, a one-dimensional array 220 of collimator-alignment mirrors 220-1 through 220-N is optically interposed between the diffraction grating 101 and the fiber collimator array 110. The collimator-alignment mirror 220-1 is designed to correspond with the input port 110-1, for adjusting the alignment of the input multi-wavelength optical signal and therefore ensuring that the spectral channels impinge onto the corresponding channel micromirrors. The collimator-alignment mirrors 220-2 through 220-N are designated to the output ports 110-2 through 110-N in a one-to-one correspondence, serving to provide angular control of the collimated beams of the reflected spectral channels and thereby facilitating the coupling of the spectral channels into the respective output ports according to desired coupling efficiencies. Each collimator-alignment mirror may be rotatable about one axis, or two axes.

Figure 2C:
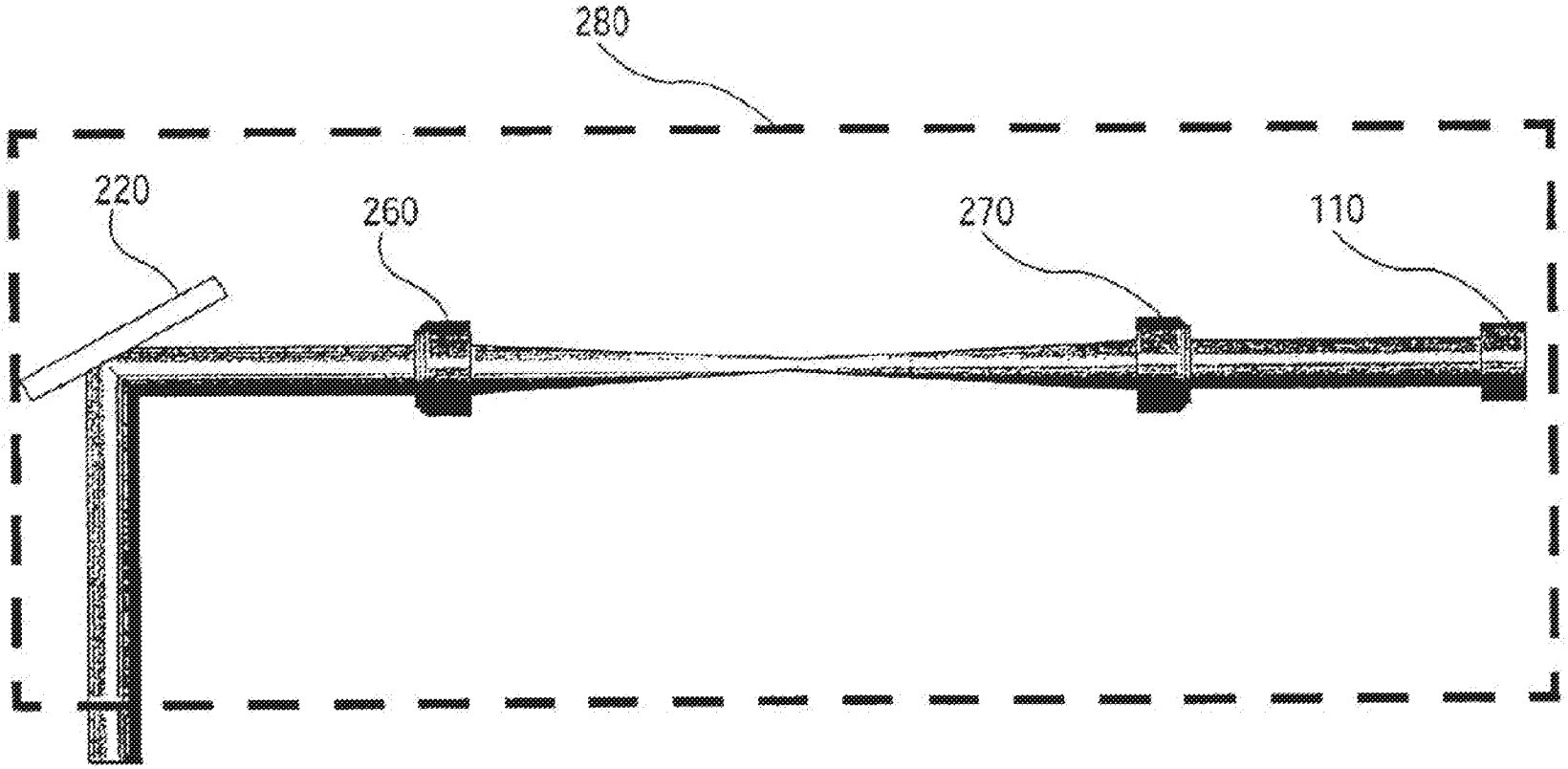

The embodiment of FIG. 2A is attractive in applications where the fiber collimators (serving as the input and output ports) are desired to be placed in close proximity to the collimator-alignment mirror array 220. To best facilitate the coupling of the spectral channels into the output ports, arrays of imaging lenses may be implemented between the collimator-alignment mirror array 220 and the fiber collimator array 110, as depicted in FIG. 2B. By way of example, WSR apparatus 250 of FIG. 2B is built upon and hence shares many of the elements used in the embodiment of FIG. 2A, as identified by those labeled with identical numerals. Additionally, first and second arrays 260, 270 of imaging lenses are placed in a 4-f telecentric arrangement with respect to the collimator-alignment mirror array 220 and the fiber collimator array 110. The dashed box 280 shown FIG. 2C provides a top view of such a telecentric arrangement. In this case, the imaging lenses in the first and second arrays 260, 270 all have the same focal length f. The collimator-alignment mirrors 220-1 through 220-N are placed at the respective first (or front) focal points of the imaging lenses in the first array 260. Likewise, the fiber collimators 110-1 through 110-N are placed at the respective second (or back) focal points of the imaging lenses in the second array 270. And the separation between the first and second arrays 260, 270 of imaging lenses is 2f. In this way, the collimator-alignment mirrors 220-1 through 220-N are effectively imaged onto the respective entrance surfaces (i.e., the front focal planes) of the GRIN lenses in the corresponding fiber collimators 110-1 through 110-N. Such a telecentric imaging system substantially eliminates translational walk-off of the collimated beams at the output ports that may otherwise occur as the mirror angles change.

FIG. 3 shows a fourth embodiment of a WSR apparatus according to the present invention. By way of example, WSR apparatus 300 is built upon and hence shares a number of the elements used in the embodiment of FIG. 2B, as identified by those labeled with identical numerals. In this case, the one-dimensional fiber collimator array 110 of FIG. 2B is replaced by a two-dimensional array 350 of fiber collimators, providing for an input-port and a plurality of output ports. Accordingly, the one-dimensional collimator-alignment mirror array 220 of FIG. 2B is replaced by a two-dimensional array 320 of collimator-alignment mirrors, and first and second one-dimensional arrays 260, 270 of imaging lenses of FIG. 2B are likewise replaced by first and second two-dimensional arrays 360, 370 of imagining lenses respectively. As in the case of the embodiment of FIG. 2B, the first and second two-dimensional arrays 360, 370 of imaging lenses are placed in a 4-f telecentric arrangement with respect to the two-dimensional collimator-alignment mirror array 320 and the two-dimensional fiber collimator array 350. The channel micromirrors 103 must be pivotable biaxially in this case (in order to direct its corresponding spectral channel to any one of the output ports). As such, the WSR apparatus 300 is equipped to support a greater number of the output ports.

In addition to facilitating the coupling of the spectral channels into the respective output ports as described above, the collimator-alignment mirrors in the above embodiments also serve to compensate for misalignment (e.g., due to fabrication and assembly errors) in the fiber collimators that provide for the input and output ports. For instance, relative misalignment between the fiber cores and their respective collimating lenses in the fiber collimators can lead to pointing errors in the collimated beams, which may be corrected for by the collimator-alignment mirrors. For these reasons, the collimator-alignment mirrors are preferably rotatable about two axes. They may be silicon micromachined mirrors, for fast rotational speeds. They may also be other types of mirrors or beam-deflecting elements known in the art.

To optimize the coupling of the spectral channels into the output ports and further maintain the optimal optical alignment against environmental effects such as temperature variations and mechanical instabilities over the course of operation, a WSR apparatus of the present invention may incorporate a servo-control assembly, for providing dynamic control of the coupling of the spectral channels into the respective output ports on a channel-by-channel basis. A WSR apparatus incorporating a servo-control assembly is termed a WSR-S apparatus, thereinafter in this specification.

Figure 4A:
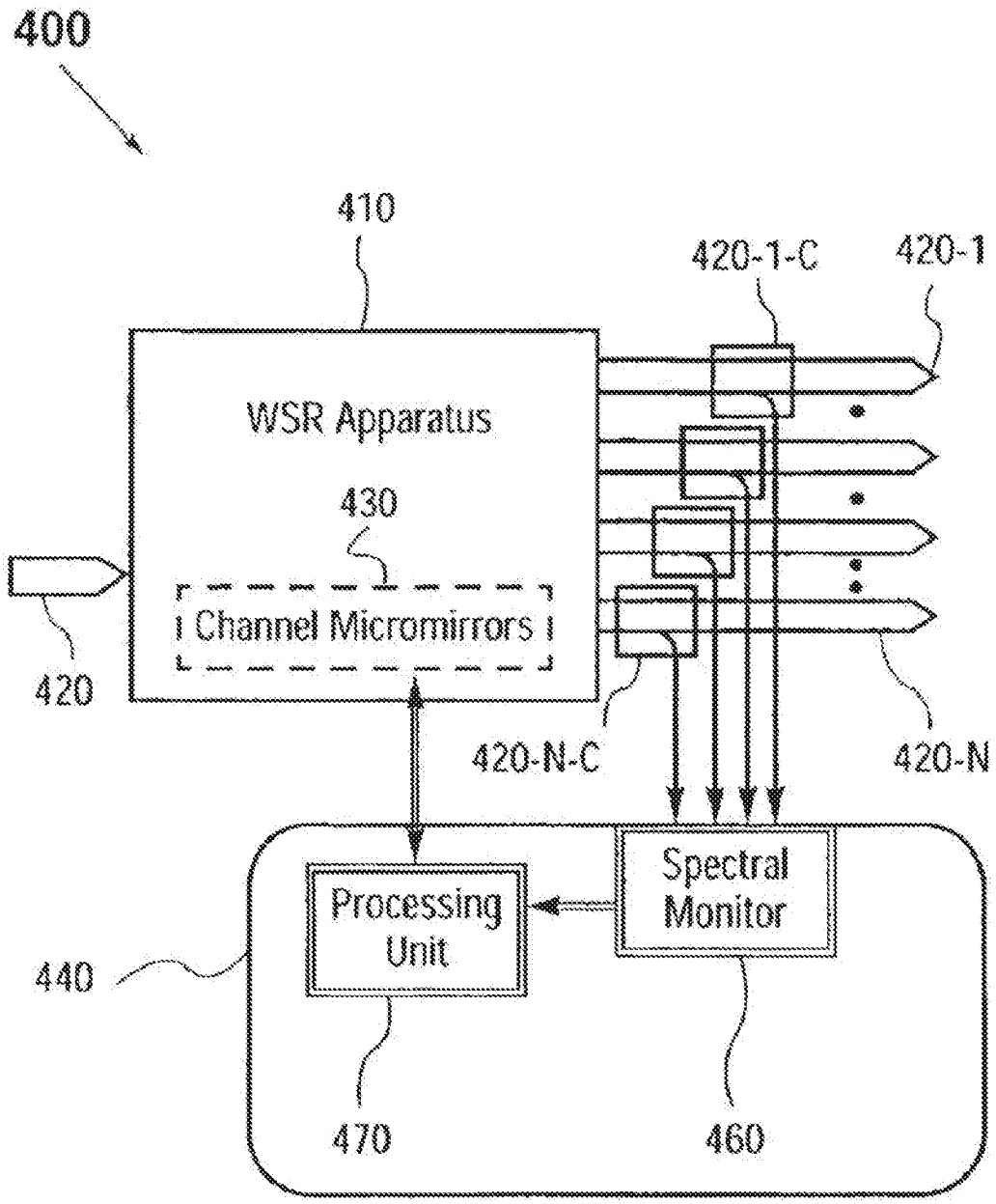
FIGS. 4A-4B show schematic illustrations of two embodiments of a WSR-S apparatus comprising a WSR apparatus and a servo-control assembly, according to the present invention.

FIG. 4A depicts a schematic illustration of a first embodiment of a WSR-S apparatus according to the present invention. The WSR-S apparatus 400 comprises a WSR apparatus 410 and a servo-control assembly 440. The WSR 410 may be in the embodiment of FIG. 1A, or any other embodiment in accordance with the present invention. The servo-control assembly 440 includes a spectral monitor 460, for monitoring the power levels of the spectral channels coupled into the output ports 420-1 through 420-N of the WSR apparatus 410. By way of example, the spectral monitor 460 is coupled to the output ports 420-1 through 420-N by way of fiber-optic couplers 420-1-C through 420-N-C, wherein each fiber-optic coupler serves to tap off a predetermined fraction of the optical signal in the corresponding output port. The servo-control assembly 440 further includes a processing unit 470, in communication with the spectral monitor 460 and the channel micromirrors 430 of the WSR apparatus 410. The processing unit 470 uses the power measurements from the spectral monitor 460 to provide feedback control of the channel micromirrors 430 on an individual basis, so as to maintain a desired coupling efficiency for each spectral channel into a selected output port. As such, the servo-control assembly 440 provides dynamic control of the coupling of the spectral channels into the respective output ports on a channel-by-channel basis and thereby manages the power levels of the spectral channels coupled into the output ports. The power levels of the spectral channels in the output ports may be dynamically managed according to demand, or maintained at desired values (e.g., equalized at a predetermined value) in the present invention. Such a spectral power-management capability is essential in WDM optical networking applications, as discussed above.

Figure 4B:
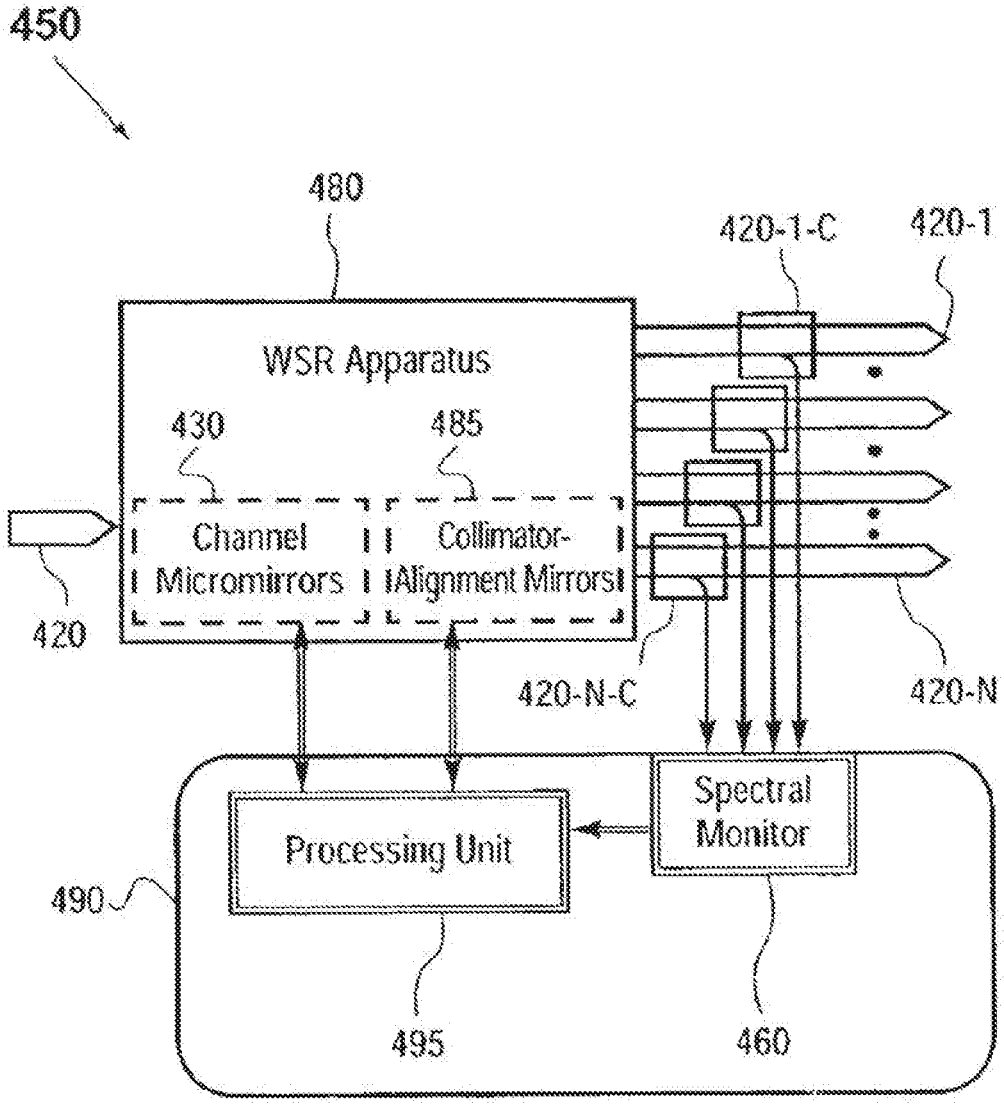

FIG. 4B depicts a schematic illustration of a second embodiment of a WSR-S apparatus according to the present invention. The WSR-S apparatus 450 comprises a WSR apparatus 480 and a servo-control assembly 490. In addition to the channel micromirrors 430 (and other elements identified by the same numerals as those used in FIG. 4A), the WSR apparatus 480 further includes a plurality of collimator-alignment mirrors 485, and may be configured according to the embodiment of FIGS. 2A, 2B, 3, or any other embodiment in accordance with the present invention. By way of example, the servo-control assembly 490 includes the spectral monitor 460 as described in the embodiment of FIG. 4A, and a processing unit 495. In this case, the processing unit 495 is in communication with the channel micromirrors 430 and the collimator-alignment mirrors 485 of the WSR apparatus 480, as well as the spectral monitor 460. The processing unit 495 uses the power measurements from the spectral monitor 460 to provide dynamic control of the channel micromirrors 430 along with the collimator-alignment mirrors 485, so to maintain the coupling efficiencies of the spectral channels into the output ports at desired values.

In the embodiment of FIG. 4A or 4B, the spectral monitor 460 may be one of spectral power monitoring devices known in the art that is capable of detecting the power levels of spectral components in a multi-wavelength optical signal. Such devices are typically in the form of a wavelength-separating means (e.g., a diffraction grating) that spatially separates a multi-wavelength optical signal by wavelength into constituent spectral components, and one or more optical sensors (e.g., an array of photodiodes) that are configured such to detect the power levels of these spectral components. The processing unit 470 in FIG. 4A (or the processing unit 495 in FIG. 4B) typically includes electrical circuits and signal processing programs for processing the power measurements received from the spectral monitor 460 and generating appropriate control signals to be applied to the channel micromirrors 430 (and the collimator-alignment mirrors 485 in the case of FIG. 4B), so to maintain the coupling efficiencies of the spectral channels into the output ports at desired values. The electronic circuitry and the associated signal processing algorithm/software for such processing unit in a servo-control system are known in the art. A skilled artisan will know how to implement a suitable spectral monitor along with an appropriate processing unit to provide a servo-control assembly in a WSP-S apparatus according to the present invention, for a given application.

The incorporation of a servo-control assembly provides additional advantages of effectively relaxing the requisite fabrication tolerances and the precision of optical alignment during initial assembly of a WSR apparatus of the present invention, and further enabling the system to correct for shift in the alignment over the course of operation. By maintaining an optimal optical alignment, the optical losses incurred by the spectral channels are also significantly reduced. As such, the WSR-S apparatus thus constructed is simpler and more adaptable in structure, more robust in performance, and lower in cost and optical loss. Accordingly, the WSR-S (or WSR) apparatus of the present invention may be used to construct a variety of optical devices and utilized in many applications.

For instance, by directing the spectral channels into the output ports in a one-channel-per-port fashion and coupling the output ports of a WSR-S (or WSR) apparatus to an array of optical sensors (e.g., photodiodes), or a single optical sensor that is capable of scanning across the output ports, a dynamic and versatile spectral power monitor (or channel analyzer) is provided, which would be highly desired in WDM optical networking applications. Moreover, a novel class of optical add-drop multiplexers (OADMs) may be built upon the WSR-S (or WSR) apparatus of the present invention, as exemplified in the following embodiments.

Figure 5:
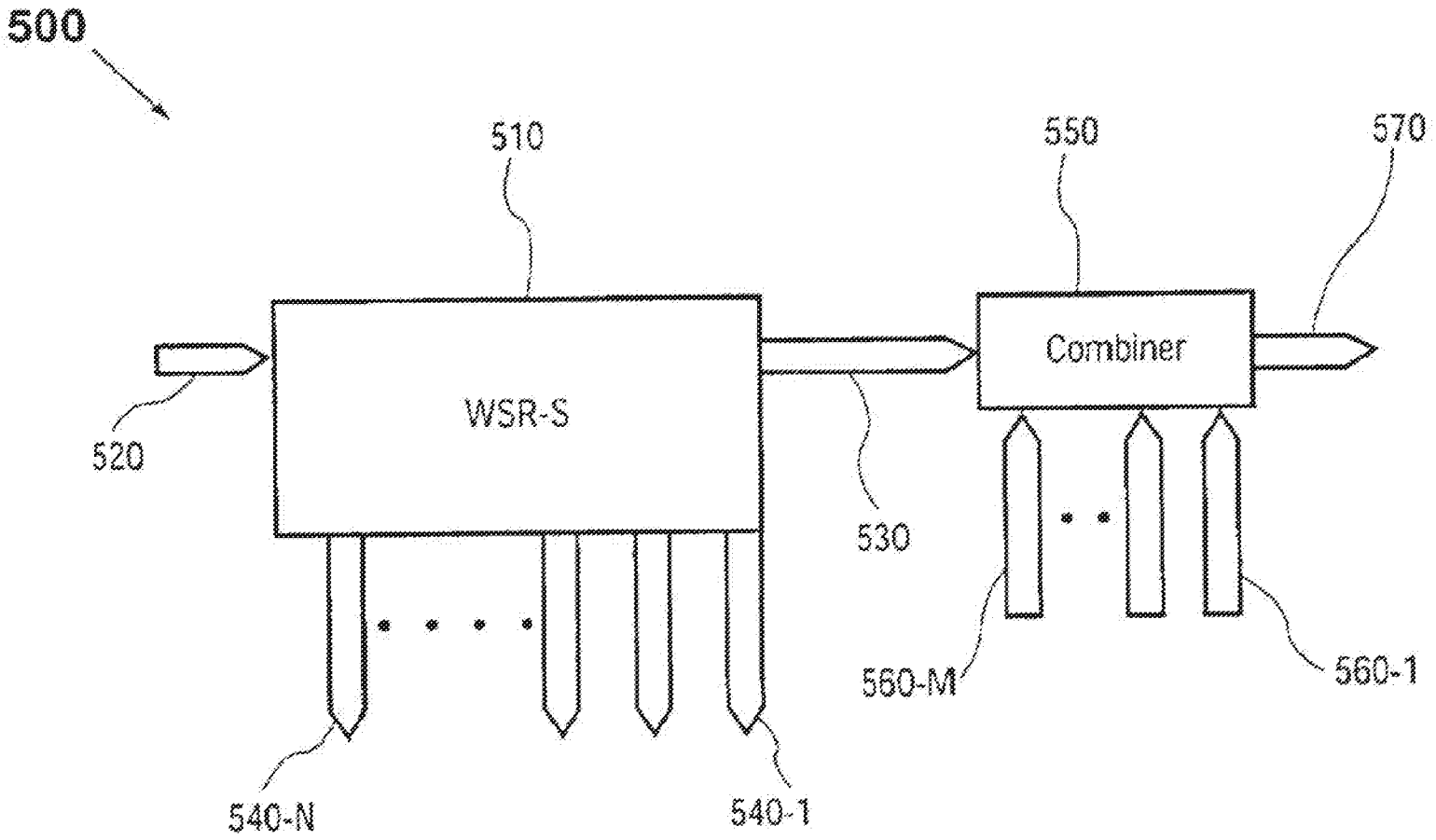
FIG. 5 depicts an exemplary embodiment of an optical add-drop multiplexer (OADM) according to the present invention.

FIG. 5 depicts an exemplary embodiment of an optical add-drop multiplexer (OADM) according to the present invention. By way of example, OADM 500 comprises a WSR-S (or WSR) apparatus 510 and an optical combiner 550. An input port 520 of the WSR-S apparatus 510 transmits a multi-wavelength optical signal. The constituent spectral channels are subsequently separated and routed into a plurality of output ports, including a pass-through port 530 and one or more drop ports 540-1 through 540-N (N≥1). The pass-through port 530 may receive any number of the spectral channels (i.e., the pass-through spectral channels). Each drop port may also receive any number of the spectral channels (i.e., the drop spectral channels). The pass-through port 530 is optically coupled to the optical combiner 550, which serves to combine the pass-through spectral channels with one or more add spectral channels provided by one or more add ports 560-1 through 560-M (M≥1). The combined optical signal is then routed into an existing port 570, providing an output multi-wavelength optical signal.

In the above embodiment, the optical combiner 550 may be a K×1 (K≥2) broadband fiber-optic coupler, wherein there are K input-ends and one output-end. The pass-through spectral channels and the add spectral channels are fed into the K input ends (e.g., in a one-to-one correspondence) and the combined optical signal exits from the output-end of the K×1 fiber-optic coupler as the output multi-wavelength optical signal of the system. Such a multiple-input coupler also serves the purpose of multiplexing a multiplicity of add spectral channels to be coupled into the OADM 500. If the power levels of the spectral channels in the output multi-wavelength optical signal are desired to be actively managed, such as being equalized at a predetermined value, two spectral monitors may be utilized. As a way of example, the first spectral monitor may receive optical signals tapped off from the pass-through port 530 and the drop ports 540-1 through 540-N (e.g., by way of fiber-optic couplers as depicted in FIG. 4A or 4B). The second spectral monitor receives optical signals tapped off from the exiting port 570. A servo-control system may be constructed accordingly for monitoring and controlling the pass-through, drop and add spectral channels. As such, the embodiment of FIG. 5 provides a versatile optical add-drop multiplexer in a simple and low-cost assembly, while providing multiple physically separate drop/add ports in a dynamically reconfigurable fashion.

Figure 6:
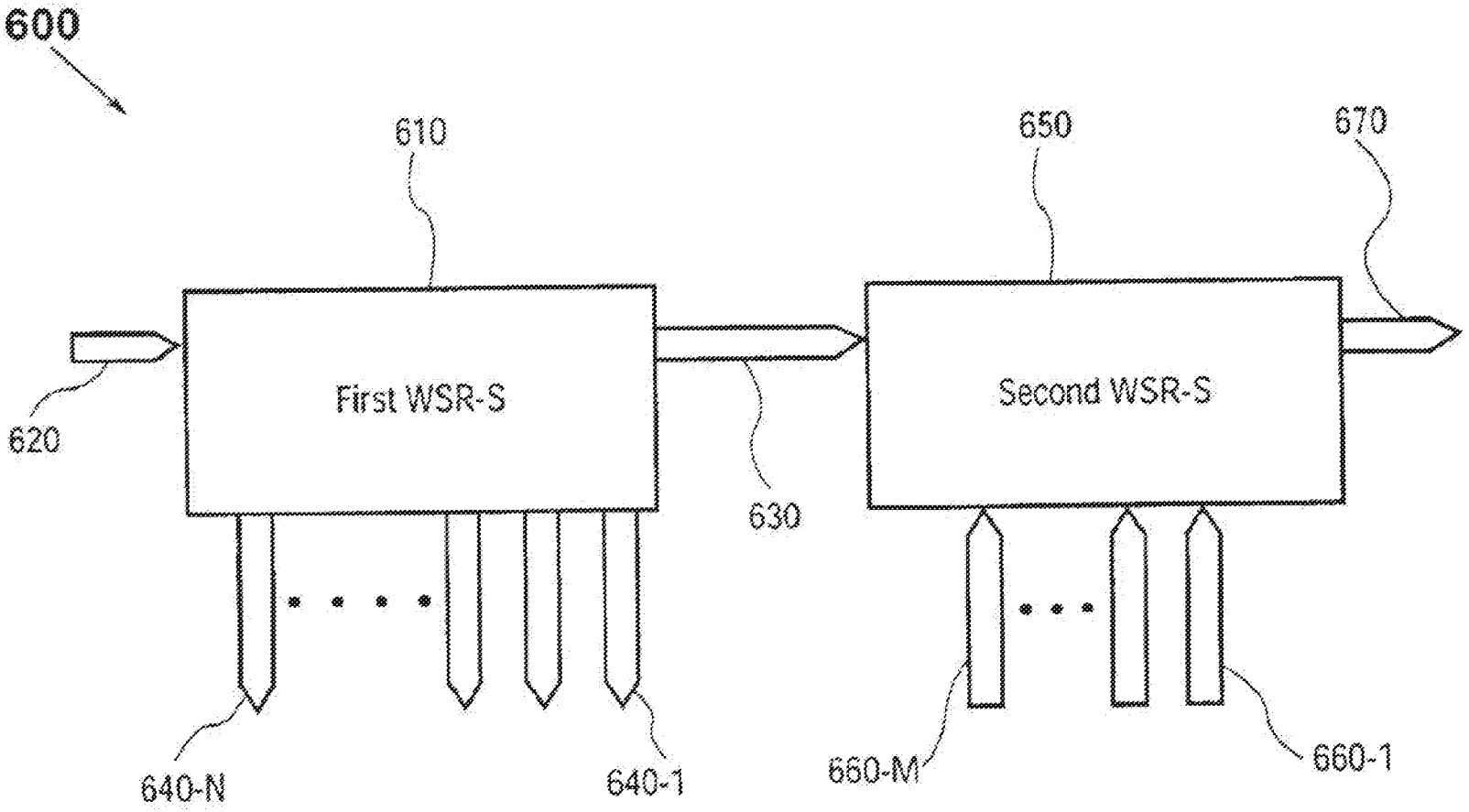
FIG. 6 shows an alternative embodiment of an OADM according to the present invention.

FIG. 6 depicts an alternative embodiment of an optical add-drop multiplexer (OADM) according to the present invention. By way of example, OADM 600 comprises a first WSR-S apparatus 610 optically coupled to a second WSR-S apparatus 650. Each WSR-S apparatus may be in the embodiment of FIG. 4A or 4B. (A WSR apparatus of the embodiment of FIG. 1A, 2A, 2B, or 3 may be alternatively implemented.) The first WSR-S apparatus 610 includes an input port 620, a pass-through port 630, and one or more drop ports 640-1 through 640-N (N≥1). The pass-through spectral channels from the pass-through port 630 are further coupled to the second WSR-S apparatus 650, along with one or more add spectral channels emerging from add ports 660-1 through 660-M (M≥1). In this exemplary case, the pass-through port 630 and the add ports 660-1 through 660-M constitute the input ports for the second WSR-S apparatus 650. By way of its constituent wavelength-separator (e.g., a diffraction grating) and channel micromirrors (not shown in FIG. 6), the second WSR-S apparatus 650 serves to multiplex the pass-through spectral channels and the add spectral channels, and route the multiplexed optical signal into an exiting port 770 to provide an output signal of the system.

In the embodiment of FIG. 6, one WSR-S apparatus (e.g., the first WSR-S apparatus 610) effectively performs dynamic drop function, whereas the other WSR-S apparatus (e.g., the second WSR-S apparatus 650) carries out dynamic add function. And there are essentially no fundamental restrictions on the wavelengths that can be added or dropped (other than those imposed by the overall communication system). Moreover, the underlying OADM architecture thus presented is intrinsically scalable and can be readily extended to any number of cascaded WSR-S (or WSR) systems, if so desired for performing intricate add and drop functions. Additionally, the OADM of FIG. 6 may be operated in reverse direction, by using the input ports as the output ports, the drop ports as the add ports, and vice versa.

Those skilled in the art will recognize that the aforementioned embodiments provide only two of many embodiments of a dynamically reconfigurable OADM according to the present invention. Those skilled in the art will also appreciate that various changes, substitutions, and alternations can be made herein without departing from the principles and the scope of the invention as defined in the appended claims. Accordingly, a skilled artisan can design an OADM in accordance with the principles of the present invention, to best suit a given application.

Although the present invention and its advantages have been described in detail, it should be understood that various changes, substitutions, and alterations can be made herein without departing from the principles and the scope of the invention. Accordingly, the scope of the present invention should be determined by the following claims and their legal equivalents.

What is claimed is:

~~1. An optical add-drop apparatus comprising~~

~~an input port for an input multi-wavelength optical signal having first spectral channels;~~

~~one or more other ports for second spectral channels; an output port for an output multi-wavelength optical signal;~~

~~a wavelength-selective device for spatially separating said spectral channels;~~

~~a spatial array of beam-deflecting elements positioned such that each element receives a corresponding one of said spectral channels, each of said elements being individually and continuously controllable *in two dimensions* to reflect its corresponding spectral channel to a selected one of said ports *and to control the power of the spectral channel reflected to said selected port.*~~

~~2. The optical add-drop apparatus of claim 1 further comprising a control unit for controlling each of said beam-deflecting elements.~~

~~3. The optical add-drop apparatus of claim 2, wherein the control unit further comprises a servo-control assembly, including a spectral monitor for monitoring power levels of selected ones of said spectral channels, and a processing unit responsive to said power levels for controlling said beam-deflecting elements.~~

~~4. The optical add-drop apparatus of claim 3, wherein said servo-control assembly maintains said power levels at predetermined values.~~

~~5. The optical add-drop apparatus of claim 2, wherein the control unit controls said beam-deflecting elements to direct selected ones of said first spectral channels to one or more of said second ports to be dropped as second spectral channels from said output multi-wavelength optical signal.~~

~~6. The optical add-drop apparatus of claim 2, wherein the control unit controls said beam-deflecting elements to direct selected ones of said second spectral channels to said output port to be added to said output multi-wavelength optical signal.~~

[[7. The optical add-drop apparatus of claim 1 further comprising alignment mirrors for adjusting alignment of said input and output multi-wavelength optical signals and said second spectral channels with said wavelength-selective device.]]

[[8. The optical add-drop apparatus of claim 7 further comprising collimators associated with said alignment mirrors, and imaging lenses in a telecentric arrangement with said alignment mirrors and said collimators.]]

~~9. The optical add-drop apparatus of claim 1, wherein said wavelength selective device further combines selected ones of said spectral channels reflected from said beam-deflecting elements to form said output multi-wavelength optical signal.~~

~~10. The optical add-drop apparatus of claim 1, wherein said one or more other ports comprise an add port and a drop port for respectively adding second and dropping first spectral channels.~~

~~11. The optical add-drop apparatus of claim 1 further comprising a beam-focuser for focusing said separated spectral channels onto said beam-deflecting elements.~~

~~12. The optical add-drop apparatus of claim 1, wherein said wavelength-selective device comprises a device selected from the group consisting of ruled diffraction gratings, holographic diffraction gratings, echelle gratings, curved diffraction gratings, and dispersing prisms.~~

~~13. The optical add-drop apparatus of claim 1, wherein said beam-deflecting elements comprise micromachined mirrors.~~

[[14. The optical add-drop apparatus of claim 1, wherein said beam-deflecting elements comprise reflective membranes.]]

~~15. An optical add-drop apparatus, comprising~~

~~an input port for an input multi-wavelength optical signal having multiple spectral channels;~~

~~an output port for an output multi-wavelength optical signal;~~

~~one or more drop ports for selected spectral channels dropped from said multi-wavelength optical signal;~~

~~a wavelength-selective device for spatially separating said multiple spectral channels; and~~

~~a spatial array of beam-deflecting elements positioned such that each element receives a corresponding one of said spectral channels, each of said elements being individually and continuously controllable *in two dimensions* to reflect its corresponding spectral channel to a selected one of said ports *and to control the power of the spectral channel reflected to said selected port,* whereby a subset of said spectral channels is directed to said drop ports.~~

~~16. An optical add-drop apparatus, comprising~~

~~an input port for an input multi-wavelength optical signal having multiple spectral channels;~~

~~an output port for an output multi-wavelength optical signal;~~

~~one or more add ports for selected spectral channels to be added to said output multi-wavelength optical signal;~~

~~a wavelength-selective device for reflecting said multiple and said selected spectral channels; and~~

~~a spatial array of beam-deflecting elements positioned such that each element receives a corresponding one of said spectral channels, each of said elements being individually and continuously controllable *in two dimensions* to reflect its corresponding spectral channel to a selected one of said ports *and to control the power of the spectral channel reflected to said selected port,* whereby said spectral channels from said add ports are selectively provided to said output port.~~

~~17. A method of performing dynamic add and drop in a WDM optical network, comprising:~~

~~separating an input multi-wavelength optical signal into spectral channels;~~

~~imaging each of said spectral channels onto a corresponding beam-deflecting element; and~~

~~controlling dynamically and continuously said beam-deflecting elements *in two dimensions* so as to combine selected ones of said spectral channels into an output multi-wavelength optical signal *and to control the power of the spectral channels combined into said output multi-wavelength optical signal.*~~

~~18. The method of claim 17, wherein said selected ones of said spectral channels comprises a subset of said spectral channels, such that other non-selected ones of said spectral channels are dropped from said output multi-wavelength optical signal.~~

~~19. The method of claim 18, wherein said controlling comprises reflecting said non-selected ones of said spectral channels to one or more drop ports.~~

~~20. The method of claim 17 further comprising imaging other spectral channels onto other corresponding beam-deflecting elements, and controlling dynamically and continuously said other beam-deflecting elements so as to combine said other spectral channels with said selected ones of said spectral channels into said output multi-wavelength optical signal.~~

~~21. The method of claim 17, wherein said imaging comprises focusing said spectral channels onto said beam-deflecting elements.~~

~~22. The method of claim 17 further comprising monitoring a power level in one or more of said selected ones of said spectral channels, and controlling an alignment between said input multi-wavelength optical signal and corresponding beam-deflecting elements in response to said monitoring.~~

23. An optical add-drop apparatus comprising an output port and fiber collimators serving as an input port and one or more other ports, the apparatus comprising:

the fiber collimator input port for an input multi-wavelength optical signal having first spectral channels;

the fiber collimator one or more other ports for second spectral channels;

the output port for an output multi-wavelength optical signal;

a wavelength-selective device for spatially separating said spectral channels;

a spatial array of beam-deflecting elements positioned such that each element receives a corresponding one of said spectral channels, each of said elements being individually and continuously controllable in two dimensions to reflect its corresponding spectral channel to a selected one of said output port or the fiber collimator ports and to control the power of the spectral channel reflected to said output port or the fiber collimator selected port.

24. The optical add-drop apparatus of claim 23 further comprising a control unit for controlling each of said beam-deflecting elements.

25. The optical add-drop apparatus of claim 24, wherein the control unit further comprises a servo-control assembly, including a spectral monitor for monitoring power levels of selected ones of said spectral channels, and a processing unit responsive to said power levels for controlling said beam-deflecting elements.

26. The optical add-drop apparatus of claim 25, wherein said servo-control assembly maintains said power levels at predetermined values.

27. The optical add-drop apparatus of claim 24, wherein the control unit controls said beam-deflecting elements to direct selected ones of said first spectral channels to one or more of said fiber collimator other ports to be dropped as second spectral channels from said output multi-wavelength optical signal.

28. The optical add-drop apparatus of claim 24, wherein the control unit controls said beam-deflecting elements to direct selected ones of said second spectral channels to said output port to be added to said output multi-wavelength optical signal.

29. The optical add-drop apparatus of claim 23 further comprising alignment mirrors for adjusting alignment of said input and output multi-wavelength optical signals and said second spectral channels with said wavelength-selective device.

30. The optical add-drop apparatus of claim 29 further comprising collimators associated with said alignment mirrors, and imaging lenses in a telecentric arrangement with said alignment mirrors and said collimators.

31. The optical add-drop apparatus of claim 23, wherein said wavelength selective device further combines selected ones of said spectral channels reflected from said beam-deflecting elements to form said output multi-wavelength optical signal.

32. The optical add-drop apparatus of claim 23, wherein said fiber collimator one or more other ports comprise a fiber collimator add port and a fiber collimator drop port for respectively adding second and dropping first spectral channels.

33. The optical add-drop apparatus of claim 23 further comprising a beam-focuser for focusing said separated spectral channels onto said beam deflecting elements.

34. The optical add-drop apparatus of claim 23, wherein said wavelength-selective device comprises a device selected from the group consisting of ruled diffraction gratings, holographic diffraction gratings, echelle gratings, curved diffraction gratings, and dispersing prisms.

35. The optical add-drop apparatus of claim 23, wherein said beam-deflecting elements comprise micromachined mirrors.

36. The optical add-drop apparatus of claim 23, wherein said beam-deflecting elements comprise reflective membranes.

37. The optical add-drop apparatus of claim 23:

wherein none of the multi-wavelength optical signal, the second spectral channels, or the output multi-wavelength optical signal are transmitted through a circulator.

38. The optical add-drop apparatus of claim 23, wherein each of the fiber collimators is a GRIN lens.

39. The optical add-drop apparatus of claim 23, wherein the fiber collimator input port, the one or more other fiber collimator ports, and the output port are arranged in a one dimensional array.

40. The optical add-drop apparatus of claim 23, wherein the fiber collimator input port, the one or more other fiber collimator ports, and the output port are arranged in a two dimensional array.

41. The optical add-drop apparatus of claim 23, wherein each of the beam-deflecting elements is configured to be capable of reflecting its corresponding spectral channel to each and every one of the fiber collimators ports.

42. The optical add-drop apparatus of claim 23, wherein the output port is separate from the fiber collimator input port.

43. The optical add-drop apparatus of claim 23, wherein the output port is three or more output ports that are separate from the fiber collimator input port.

44. The optical add-drop apparatus of claim 23, further comprising a power-management system configured to manage power levels of at least one of the first spectral channels and the second spectral channels.

45. The optical add-drop apparatus of claim 44, wherein the power-management system is further configured to control coupling efficiency of one of the first and second spectral channel to at least one port.

46. The optical add-drop apparatus of claim 23, wherein the beam-deflecting elements are micromirrors.

47. An optical add-drop apparatus, comprising:

a fiber collimator serving as an input port for an input multi-wavelength optical signal having multiple spectral channels;

an output port for an output multi-wavelength optical signal;

one or more fiber collimators serving as one or more drop ports for selected spectral channels dropped from said multi-wavelength optical signal;

a wavelength-selective device for spatially separating said multiple spectral channels; and a spatial array of beam-deflecting elements positioned such that each element receives a corresponding one of said spectral channels, each of said elements being individually and continuously controllable in two dimensions to reflect its corresponding spectral channel to a selected one of said output port or the fiber collimators serving as said ports and to control the power of the spectral channel reflected to said output port of the fiber collimator serving as said selected port, whereby a subset of said spectral channels is directed to said fiber collimator serving as said drop ports.

48. The optical add-drop apparatus of claim 47, wherein none of the input or output multi-wavelength optical signal or the spectral channels are transmitted through a circulator.

49. An optical add-drop apparatus, comprising:

a fiber collimator serving as an input port for an input multi-wavelength optical signal having multiple spectral channels;

an output port for an output multi-wavelength optical signal;

one or more fiber collimators serving as one or more add ports for selected spectral channels to be added to said output multi-wavelength optical signal;

a wavelength-selective device for reflecting said multiple and said selected spectral channels; and a spatial array of beam-deflecting elements positioned such that each element receives a corresponding one of said spectral channels, each of said elements being individually and continuously controllable in two dimensions to reflect its corresponding spectral channel to a selected one of said output port or the fiber collimator serving as said ports and to control the power of the spectral channel reflected to said output port or said fiber collimator serving as said selected port, whereby said spectral channels from said fiber collimators serving as said add ports are selectively provided to said output port.

50. The optical add-drop apparatus of claim 49, wherein none of the input or output multi-wavelength optical signal or the spectral channels are transmitted through a circulator.

51. A method of performing dynamic add and drop in a WDM optical network, comprising:

separating an input multi-wavelength optical signal into spectral channels;

imaging each of said spectral channels onto a corresponding beam-deflecting element;

controlling dynamically and continuously said beam-deflecting elements in two dimensions so as to combine selected ones of said spectral channels into an output multi-wavelength optical signal and to control the power of the spectral channels combined into said output multi-wavelength optical signal;

receiving the output multi-wavelength optical signal at an output port that transmits the output multi-wavelength optical signal to an optical fiber; and wherein said selected ones of said spectral channels comprises a subset of said spectral channels, such that other non-selected ones of said spectral channels are dropped from said output multi-wavelength optical signal; and said controlling comprises reflecting said non-selected ones of said spectral channels to one or more fiber collimator serving as drop ports.

52. The method of claim 51 further comprising imaging other spectral channels onto other corresponding beam-deflecting elements, and controlling dynamically and continuously said other beam-deflecting elements so as to combine said other spectral channels with said selected ones of said spectral channels into said output multi-wavelength optical signal.

53. The method of claim 51, wherein said imaging comprises focusing said spectral channels onto said beam-deflecting elements.

54. The method of claim 51 further comprising monitoring a power level in one or more of said selected ones of said spectral channels, and controlling an alignment between said input multi-wavelength optical signal and corresponding beam-deflecting elements in response to said monitoring.

* * * * *